United States Patent
Dormiani et al.

(10) Patent No.: US 11,066,156 B2
(45) Date of Patent: Jul. 20, 2021

(54) PROPELLER UNITS

(71) Applicant: Wing Aviation LLC, Mountain View, CA (US)

(72) Inventors: Parsa Dormiani, San Mateo, CA (US); James Ryan Burgess, Redwood City, CA (US)

(73) Assignee: Wing Aviation LLC, Mountain View, CA (US)

( * ) Notice: Subject to any disclaimer, the term of this patent is extended or adjusted under 35 U.S.C. 154(b) by 150 days.

(21) Appl. No.: 16/174,228

(22) Filed: Oct. 29, 2018

(65) Prior Publication Data

US 2019/0071171 A1    Mar. 7, 2019

Related U.S. Application Data

(62) Division of application No. 14/706,162, filed on May 7, 2015, now Pat. No. 10,137,982.

(Continued)

(51) Int. Cl.
*B64C 27/26* (2006.01)
*B64C 27/39* (2006.01)
(Continued)

(52) U.S. Cl.
CPC ............. *B64C 27/26* (2013.01); *B64C 11/28* (2013.01); *B64C 27/30* (2013.01); *B64C 27/39* (2013.01);
(Continued)

(58) Field of Classification Search
CPC ......... B64C 27/26; B64C 27/30; B64C 27/39; B64C 27/024; B64C 11/28; B64C 2201/02; B64C 2201/108
See application file for complete search history.

(56) References Cited

U.S. PATENT DOCUMENTS

RE21,478 E  *  6/1940  Smith ................... B64C 27/26
                                                    244/6
2,222,444 A    11/1940  Schmidt et al.
(Continued)

OTHER PUBLICATIONS

Brocklehurst et al., "A review of helicopter rotor blade tip shapes", Progress in Aerospace Sciences, 56 (2013) pp. 35-74.

*Primary Examiner* — Medhat Badawi
*Assistant Examiner* — Vicente Rodriguez
(74) *Attorney, Agent, or Firm* — McDonnell Boehnen Hulbert & Berghoff LLP

(57) ABSTRACT

An aerial vehicle includes one or more propeller units operable to provide thrust for takeoff or hover flight and one or more propulsion units operable to provide thrust for forward flight. At least one propeller unit includes a shaft coupled to a motor, and a first propeller blade and a second propeller blade that are both connected to the shaft. The second propeller blade is located substantially opposite the first propeller blade, and the second propeller blade has a surface area substantially perpendicular to an axis of rotation that is greater than a corresponding surface area of the first propeller blade. While the aerial vehicle is in forward flight in a first direction and the motor is turned off, the first propeller blade and the second propeller blade are each configured to orient in a second direction that is substantially parallel to the first direction, such that the first propeller blade is oriented substantially upwind of the second propeller blade.

17 Claims, 18 Drawing Sheets

Related U.S. Application Data

(60) Provisional application No. 61/991,513, filed on May 11, 2014.

(51) Int. Cl.
*B64C 39/02* (2006.01)
*B64C 11/28* (2006.01)
*B64C 27/30* (2006.01)

(52) U.S. Cl.
CPC ........ *B64C 39/024* (2013.01); *B64C 2201/02* (2013.01); *B64C 2201/108* (2013.01)

(56) References Cited

U.S. PATENT DOCUMENTS

| | | |
|---|---|---|
| 2,369,276 A | 2/1945 | Cameron |
| 2,371,160 A | 3/1945 | Everts |
| 2,582,107 A | 1/1952 | Dakin |
| 2,665,859 A | 1/1954 | Papadakos |
| 2,953,319 A | 1/1955 | Gluhareff |
| 3,528,630 A | 9/1970 | Ferris |
| 3,957,229 A * | 5/1976 | Davis ................ B64C 11/28 244/53 R |
| 4,789,115 A | 12/1988 | Koutsoupidis |
| 5,096,383 A | 3/1992 | Dobrzynski |
| 5,620,303 A | 4/1997 | Moffitt et al. |
| 5,971,322 A | 10/1999 | Beretta |
| 6,065,933 A | 5/2000 | Secord |
| 6,234,422 B1 | 5/2001 | Bolonkin |
| 8,376,264 B1 * | 2/2013 | Hong ................ B64C 27/26 244/17.23 |
| 9,120,560 B1 | 9/2015 | Armer et al. |
| 9,598,169 B1 | 3/2017 | LeGrand, III et al. |
| 10,137,982 B1 | 11/2018 | Dromiani et al. |
| 10,155,585 B2 * | 12/2018 | Johannesson ........... B64C 27/50 |
| 2009/0226314 A1 | 9/2009 | Bogrash |
| 2010/0072325 A1 | 3/2010 | Sambell |
| 2010/0243821 A1* | 9/2010 | Lim ................ B64C 27/08 244/7 A |
| 2011/0180673 A1* | 7/2011 | Lim ................ B64C 27/24 244/7 A |
| 2012/0025016 A1 | 2/2012 | Methven et al. |
| 2012/0104763 A1 | 5/2012 | Lind |
| 2012/0292456 A1 | 11/2012 | Hollimon et al. |
| 2013/0115083 A1 | 5/2013 | Vuillemin |
| 2013/0251525 A1* | 9/2013 | Saiz ................ B64C 27/30 416/23 |
| 2014/0064968 A1 | 3/2014 | Negulescu et al. |
| 2014/0346283 A1 | 11/2014 | Salyer |
| 2015/0056058 A1 | 2/2015 | Grissom et al. |
| 2015/0147181 A1 | 5/2015 | Henze et al. |
| 2015/0266571 A1* | 9/2015 | Bevirt ................ B64C 11/28 244/7 C |
| 2015/0344127 A1 | 12/2015 | Wood et al. |
| 2016/0169198 A1 | 6/2016 | Hotto |

* cited by examiner

PROPELLER UNITS

CROSS-REFERENCE TO RELATED APPLICATIONS

The present application is a division of U.S. application Ser. No. 14/706,162, filed May 7, 2015, which claims the benefit of U.S. Provisional Application No. 61/991,513, filed May 11, 2014. The entire disclosure contents of U.S. application Ser. No. 14/706,162 and U.S. Provisional Application No. 61/991,513 are herewith incorporated by reference into the present application.

BACKGROUND

Unless otherwise indicated herein, the materials described in this section are not prior art to the claims in this application and are not admitted to be prior art by inclusion in this section.

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Embodiments taking the form of or otherwise related to propeller units are disclosed herein. Example propeller units may be operable to provide thrust for takeoff and a certain flight mode of an aerial vehicle. Further, when the aerial vehicle is in another flight mode, example propeller units may be turned off and orient in a certain direction, which reduces drag on the aerial vehicle, reduces oscillation of the aerial vehicle, and/or reduces air flow disruption. Accordingly, embodiments described herein can reduce the thrust-to-weight ratio and/or improve the energy efficiency of the aerial vehicle.

In one aspect, an aerial vehicle may include one or more propeller units connected to the aerial vehicle, wherein the one or more propeller units are operable to provide thrust for takeoff of the aerial vehicle or hover flight of the aerial vehicle, wherein at least one of the one or more propeller units may include: a shaft coupled to a motor; and a first propeller blade and a second propeller blade that are both connected to the shaft, wherein the second propeller blade is located substantially opposite the first propeller blade, wherein the second propeller blade has a surface area substantially perpendicular to an axis of rotation that is greater than a corresponding surface area of the first propeller blade; and one or more propulsion units connected to the aerial vehicle, wherein the one or more propulsion units are operable to provide thrust for forward flight of the aerial vehicle, and wherein while the aerial vehicle is in forward flight in a first direction and the motor of the at least one propeller unit is turned off, the first propeller blade and the second propeller blade are each configured to orient in a second direction that is substantially parallel to the first direction, such that the first propeller blade is oriented substantially upwind of the second propeller blade.

In another aspect, an aerial vehicle may include one or more propeller units connected to the aerial vehicle, wherein the one or more propeller units are operable to provide thrust for takeoff of the aerial vehicle or hover flight of the aerial vehicle, wherein at least one of the one or more propeller units may include a shaft coupled to a motor; and a propeller blade and a weight that are both connected to the shaft, wherein the weight is located substantially opposite the propeller blade; and one or more propulsion units connected to the aerial vehicle, wherein the one or more propulsion units are operable to provide thrust for forward flight of the aerial vehicle, and wherein while the aerial vehicle is in forward flight in a first direction and the motor of the at least one propeller unit is turned off, the propeller blade and the weight are each configured to orient in a second direction that is substantially parallel to the first direction, such that the weight is oriented substantially upwind of the propeller blade.

In another aspect, an aerial vehicle may include one or more propeller units connected to the aerial vehicle, wherein the one or more propeller units are operable to provide thrust for takeoff of the aerial vehicle or hover flight of the aerial vehicle, wherein at least one propeller unit of the one or more propeller units may include: a shaft coupled to a motor; a hub connected to the shaft, wherein the hub has a first end and second end that is opposite the first end; and a first propeller blade and a second propeller blade that are both connected to the hub; and one or more propulsion units connected to the aerial vehicle, wherein the one or more propulsion units are operable to provide thrust for forward flight of the aerial vehicle, and wherein while the aerial vehicle is in forward flight in a first direction and the motor is turned off, the first propeller blade is configured to rotate to increase a first angle between the first propeller blade and an axis defined by the first direction and the second propeller blade is configured to rotate to increase a second angle between the second propeller blade and the axis defined by the first direction.

In another aspect, a method may involve operating one or more propeller units connected to an aerial vehicle, such that the aerial vehicle takes off and enters hover flight; operating one or more propulsion units connected to the aerial vehicle and the one or more propeller units, such that the aerial vehicle transitions from hover flight to forward flight; and while the aerial vehicle is in forward flight in a first direction, turning off the one or more propeller units, such that the one or more propeller units orient in one or more respective second directions that are each substantially parallel to the first direction.

In yet another aspect, a system may involve means for operating one or more propeller units connected to an aerial vehicle, such that the aerial vehicle takes off and enters hover flight; means for operating one or more propulsion units connected to the aerial vehicle and the one or more propeller units, such that the aerial vehicle transitions from hover flight to forward flight; and while the aerial vehicle is in forward flight in a first direction, means for turning off the one or more propeller units, such that the one or more propeller units orient in one or more respective second directions that are each substantially parallel to the first direction.

These as well as other aspects, advantages, and alternatives, will become apparent to those of ordinary skill in the art by reading the following detailed description, with reference where appropriate to the accompanying drawings.

DETAILED DESCRIPTION

Figure 1A:
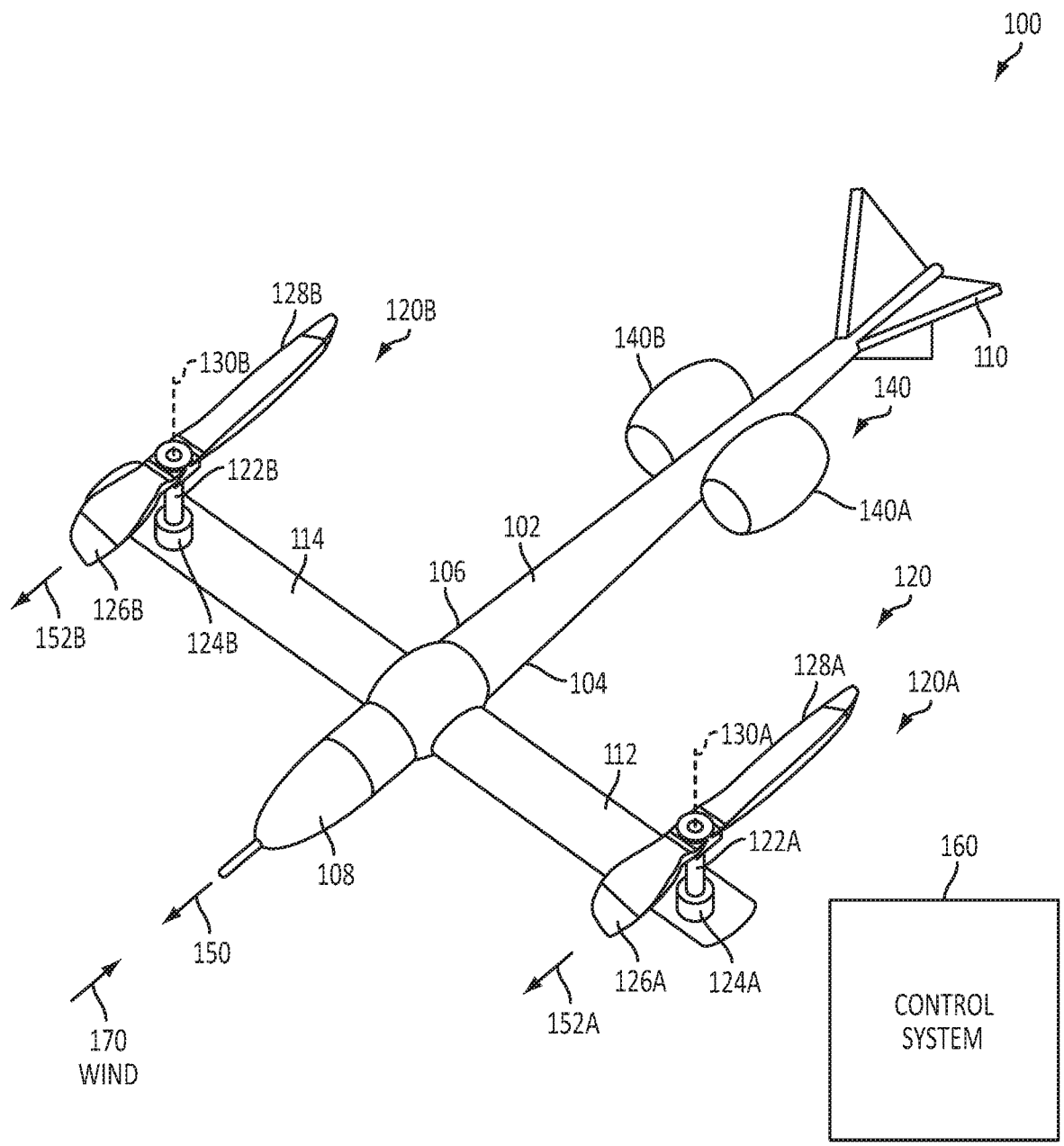
FIG. 1a depicts an aerial vehicle, according to an example embodiment.

The following detailed description describes various features and functions of the disclosure with reference to the accompanying Figures. In the Figures, similar symbols typically identify similar components, unless context dictates otherwise. The illustrative systems described herein are not meant to be limiting. It will be readily understood that certain aspects of the disclosure can be arranged and combined in a wide variety of different configurations, all of which are contemplated herein.

I. OVERVIEW

Embodiments described herein may be implemented in or take the form of an aerial vehicle; for example, a UAV. In particular, illustrative embodiments may relate to or take the form of propeller units that may be operable to provide thrust for takeoff and a certain flight mode of an aerial vehicle, and when the aerial vehicle is in another flight mode, orient in a certain direction.

By way of background, an aerial vehicle may be configured for two or more flight modes, such as hover flight and forward flight. Forward flight may be used by the aerial vehicle to travel from one location to another (e.g., from the city hall of Palo Alto to the city hall of San Francisco). In some implementations, forward flight may be the primary technique that is used to travel between two locations. Forward flight may be referred to as airplane-like flight.

Hover flight in turn may be used by the aerial vehicle to prepare and position itself for forward flight. In particular, the aerial vehicle could ascend and/or descend to a location for forward flight via hover flight. Further, the aerial vehicle could takeoff and/or land via hover flight. With this arrangement, the aerial vehicle may takeoff and land at locations without a runway of airport.

In an illustrative embodiment, an aerial vehicle may include propeller units operable to provide thrust for takeoff and hover flight and separate propulsion units operable to provide thrust for forward flight. The propeller units may each include propeller blade(s) driven by a motor. In some scenarios, while the aerial vehicle is taking off and/or in hover flight, the propulsion units may provide substantially no thrust; for example, the propulsion units may be turned off. And, in some scenarios, while the aerial vehicle is in forward flight, the propeller units may provide substantially no thrust (e.g., by turning off the motors that drive the propeller blades). Further, in some scenarios, the propeller units and the propulsion units may provide thrust when the aerial vehicle is transitioning between flight modes.

In example embodiments, when the aerial vehicle is in forward flight and the motors that drive the propeller blades are turned off, the propeller units may each be configured to orient in a certain direction, such as a direction that is substantially parallel to a direction of travel of the aerial vehicle in forward flight. Such an orientation of the propeller units may reduce drag on the propeller units, may reduce turbulence near the propellers, and/or may reduce air disruption caused at least in part by the propeller units.

In some implementations, a propeller unit may include a shaft coupled to a motor and a first propeller blade and a second propeller blade that are both connected to the shaft. The second propeller blade may be located substantially opposite to the first propeller blade, and the second propeller blade may have a surface area substantially perpendicular to an axis of rotation that is greater than a corresponding surface area of the first propeller blade. While the aerial vehicle is in forward flight in a first direction and the motor of the propeller unit is turned off, the first propeller blade and the second propeller blade may each be configured to orient in a second direction that is substantially parallel to the first direction, such that the first propeller blade is oriented substantially upwind of the second propeller blade.

Moreover, in some implementations, a propeller unit may include a shaft coupled to a motor and a propeller blade and a weight that are both coupled to the shaft. The weight may be located substantially opposite the propeller blade. While the aerial vehicle is in forward flight in a first direction and the motor of the propeller unit is turned off, the propeller blade and the weight may each be configured to orient in a second direction that is substantially parallel to the first direction, such that the weight is oriented substantially upwind of the propeller blade.

Further, in some implementations, a propeller unit may include a shaft coupled to a motor, a hub connected to the shaft, and a first propeller blade and a second propeller blade that are both connected to the hub. The hub may have a first end and a second end. While the aerial vehicle is in forward flight in a first direction and the motor of the propeller unit is turned off, the first propeller blade may be configured to rotate to increase a first angle between the first propeller blade and an axis defined by the first direction and the second propeller blade may be configured to rotate to increase a second angle between the second propeller blade and the axis defined by the first direction. And in at least one such implementation, the first propeller blade may be further configured to orient in a second direction that is substantially parallel to the first direction and the second propeller blade may be further configured to orient in a third direction that is substantially parallel to the first direction, such that the first propeller blade and the second propeller blade are each oriented substantially downwind of the first end of the hub.

Other embodiments may relate to or take the form of methods for operating an aerial vehicle. For instance, some implementations may involve operating an aerial vehicle's propeller units, such that the aerial vehicle takes off and enters hover flight; operating an aerial vehicle's propulsion units and the propeller units, such that the aerial vehicle transitions from hover flight to forward flight; and while the aerial vehicle is in forward flight, turning off the propeller units, such that the propeller units orient in respective directions that are each substantially parallel to a direction of travel of the aerial vehicle.

Beneficially, embodiments described herein may reduce drag on an aerial vehicle in forward flight, reduce instability of the aerial vehicle in forward flight, reduce oscillation of the aerial vehicle in forward flight, and/or reduce disruption of air flow over the aerial vehicle in forward flight, any or all which may reduce the thrust of the aerial vehicle for forward flight. Such a reduction in the thrust of the aerial vehicle for forward flight may allow a thrust-to-weight ratio of the aerial vehicle to be reduced and/or improve the energy efficiency of the aerial vehicle. Accordingly, in some implementations, the size of certain components of the aerial vehicle, such as the propulsion units, may be reduced. Further, in some implementations, the size of a payload of the aerial vehicle may be increased. Further still, in some implementations, the flight range of the aerial vehicle may be increased.

In accordance with this disclosure, the propeller units described herein encompass devices that in other contexts may be referred to as rotor units.

It should be understood that the above embodiments, and other embodiments described herein, are provided for explanatory purposes, and are not intended to be limiting.

II. ILLUSTRATIVE SYSTEMS

A. Aerial Vehicles

FIGS. 1-3 depict aerial vehicles and components of aerial vehicles, according to example embodiments. The dimensions of the aerial vehicles and components of the aerial vehicles are not illustrated to scale. Instead, the drawings in FIGS. 1-3 schematically illustrate the aerial vehicles and components of the aerial vehicles for purposes of explanation only.

FIG. 1a depicts an aerial vehicle 100, according to an example embodiment. In particular, the aerial vehicle includes a body 102, a first wing 112, a second wing 114, one or more propeller units 120, and one or more propulsion units 140.

As shown in FIG. 1a, the body 102 includes a first side 104, a second side 106, a front section 108, and a rear section 110. The body 102 may be a fuselage, as but one example, though other bodies and/or other types of bodies are possible as well. The front section 108 of the body 102 may include one or more components (e.g., a nose) to minimize aerodynamic forces on the aerial vehicle 100 during hover flight and/or forward flight, such as drag. The rear section 110 of the body 102 may include one or more components (e.g., tail fins, elevators, rudders) to assist in stabilizing the aerial vehicle 100 during hover flight and/or forward flight. Moreover, the body 102 may include one or more components (e.g., pads, wheels) to assist in takeoff and landing as described herein. Further, the body 102 may contain a payload.

The first wing 112 and the second wing 114 may provide a lift to the aerial vehicle 100 to resist gravity and/or translate the aerial vehicle 100. The first wing 112 is connected to the first side 104 of the body 102, and the second wing 114 is connected to the second side 106 of the body 102. The first wing 112 may be connected to the first side 104 of the body 102 by any suitable connection, such as a welded or fastened connection. In addition, the second wing 114 may be connected to the second side 106 of the body 102 by any suitable connection, such as a welded or fastened connection.

The first wing 112 and the second wing 114 could take various different forms in various different embodiments. For instance, in some embodiments, the first wing 112 and the second wing 114 may each be one or more rigid or flexible airfoils, and may each include various control surfaces, such as winglets, flaps (e.g., Fowler flaps, Hoerner flaps, split flaps, and the like), rudders, elevators, spoiler, dive brakes, etc. Moreover, in some embodiments, one or more control surfaces may be located on a leading edge of the first wing 112 and/or a leading edge of the second wing 114. Further, in some embodiments, one or more control surfaces may be located on a trailing edge of the first wing 112 and/or a trailing edge of the second wing 114 And other wings and/or types of wings are possible as well.

The one or more propeller units 120 may be operable to provide thrust for takeoff and hover flight of the aerial vehicle 100. With this arrangement, the thrust provided by the one or more propeller units may provide a lift to the aerial vehicle 100 to resist gravity and/or translate the aerial vehicle 100. Further, the one or more propulsion units 140 may be operable to provide thrust for forward flight of the aerial vehicle 100. With this arrangement, the thrust provided by the one or more propulsion units 140 may help the first wing 112 and the second wing 114 provide a lift to the aerial vehicle to resist gravity and/or translate the aerial vehicle. In addition, the one or more propeller units and/or the one or more propulsion units 140 may be operable to provide thrust for transition between flight modes.

In the illustrated example, the one or more propulsion units 140 include two propulsion units, a first propulsion unit 140A and a second propulsion unit 140B. However, in other examples, the one or more propulsion units may include one propulsion unit or more than two propulsion units, such as three propulsion units, four propulsion units, five propulsion units, ten propulsion units, twenty propulsion units, etc. For instance, in some examples, the one or more propulsion units 140 may include between two and twenty propulsion units.

Moreover, in the illustrated example, the first propulsion unit 140A is connected to the first side 104 of the body 102, and the second propulsion unit 140A is connected to the second side 106 of the body 102. The first propulsion unit 140A may be connected to the first side 104 of the body 102 by any suitable connection, such as a welded or fastened connection. In addition, the second propulsion unit 140B may be connected to the second side 106 of the body 102 by any suitable connection, such as a welded or fastened connection.

However, in other examples, the first propulsion unit 140A and/or the second propulsion unit 140B may be connected to other portions of the aerial vehicle 100, such as the first wing 112, the second wing 114, the front section 108 of the body 102, and/or the rear section 110 of the body 102. The first propulsion unit 140A and/or the second propulsion unit 140B may be connected to the other portions of the aerial vehicle 100 by any suitable connection, such as a welded or fastened connection.

The first propulsion unit 140A and/or the second propulsion unit 140B could take various different forms in various different embodiments. For instance, in some embodiments, the first propulsion unit 140A and/or the second propulsion unit 140B may include a propulsion pod, a jet, and/or a propeller. Moreover, in some embodiments, the first propulsion unit 140A and/or the second propulsion unit 140B may be in a push-type or pull-type configuration. And other propulsion units and/or types of propulsion units are possible as well.

In some embodiments, the first propulsion unit 140A and/or the second propulsion unit 140B may be powered by a fuel, such as a hydrocarbon-based fuel. And in at least one such embodiment, the fuel may be stored in the body 102 and delivered to the first propulsion unit 140A and the second propulsion unit 140B via one or more fluid conduits, such as piping. Moreover, in some embodiments, the first propulsion unit 140A and/or the second propulsion unit 140B may be powered by one or more batteries. And in at least on such embodiment, the one or more batteries may be located on the body 102 and connected to the first propulsion unit 140A and/or the second propulsion unit 140B via one or more electrical connections, such as one or more wires and/or wireless interfaces. Further, in some embodiments, the one or more batteries may be rechargeable by a charging system, such as an inductive charging system that applies an external time-varying magnetic field to an internal battery or a charging system that uses energy collected from one or more solar panels.

In the illustrated example, the one or more propeller units 120 include two propeller units, a first propeller unit 120A and a second propeller unit 120B. However, in other examples, the one or more propeller units 120 may include one propeller unit or more than two propeller units, such as three propeller units, four propeller units, five propeller units, ten propeller units, twenty propeller units, etc. For instance, in some examples, the one or more propeller units 120 may include between two and twenty propeller units.

The first propeller unit 120A includes a shaft 122A coupled to a motor 124A, and a first propeller blade 126A and a second propeller blade 128A that are both connected to the shaft 122A. The second propeller blade 128A is located substantially opposite the first propeller blade 126A. In some embodiments, the second propeller blade 128A may be located opposite the first propeller blade 126A or a deviation from opposite that does not cause the aerial vehicle 100 to operate in a significantly different manner from when the second propeller blade 128A is located opposite the first propeller blade 126A.

In the illustrated example, the motor 124A is connected to the first wing 112. The motor 124A may be connected to the first wing 112 by any suitable connection, such as a welded or fastened connection. However, in other examples, the motor 124A may be connected to other portions of the aerial vehicle 100, such as the first side 104 of the body 102, the second side 106 of the body, the front section 108 of the body 102, the rear section 110 of the body 102, and the second wing 114.

In some embodiments, the motor 124A may be powered by a fuel, such as a hydrocarbon-based fuel. And in at least one such embodiment, the fuel may be stored in the body 102 and delivered to the motor 124A via one or more fluid conduits, such as piping. Moreover, in some embodiments, the motor 124A may be powered by one or more batteries. And in at least on such embodiment, the one or more batteries may be located on the body 102 and connected to the motor 124A via one or more electrical connections, such as one or more wires and/or wireless interfaces. Further, in some embodiments, the one or more batteries may be rechargeable by a charging system, such as an inductive charging system that applies an external time-varying magnetic field to an internal battery or a charging system that uses energy collected from one or more solar panels. In some implementations, the motor 124A may be powered by the same power source as the one or more propulsion units 140.

When the motor 124A is turned on, the motor 124A may drive the shaft 122A so as to rotate the first propeller blade 126A and the second propeller blade 128A around an axis of rotation 130A. With this arrangement, when the motor 124A is turned on, the first propeller blade 126A and the second propeller blade 128A may provide substantially the same thrust along the axis of rotation 130A. In some embodiments, the first propeller blade 126A and the second propeller blade 128A may provide the same thrust or a deviation from the same that does not cause the aerial vehicle 100 to operate in a significantly different manner from when the first propeller blade 126A and the second propeller blade 128A provide the same thrust. The thrust provided by the first propeller blade 126A and the second propeller blade 128A may contribute to a lift of the aerial vehicle 100 for takeoff and hover flight. In addition, the thrust provided by the first propeller blade 126A and the second propeller blade 128A may contribute to a lift of the aerial vehicle 100 for transitioning between flight modes.

As shown in FIG. 1*a*, the aerial vehicle 100 may fly above ground into wind 170. When the aerial vehicle 100 is in forward flight in a first direction 150 and the motor 124A is turned off, the first propeller blade 126A and the second propeller blade 128A may each be configured to orient in a second direction 152A that is substantially parallel to the first direction 150, such that the first propeller blade 126A is oriented substantially upwind of the second propeller blade 128A. In some embodiments, the second direction 152A may be parallel to the first direction 150 or a deviation from parallel that does not cause the aerial vehicle 100 to operate in a significantly different manner from when the second direction 152A is parallel to the first direction 150. Moreover, in some embodiments, the first propeller blade 126A may be oriented upwind of the second propeller blade 128A or a deviation from upwind that does not cause the aerial vehicle 100 to operate in a significantly different manner from when the first propeller blade 126A is oriented upwind of the second propeller blade 128A.

In some embodiments, the first direction 150 may be substantially perpendicular to the axis of rotation 130A. Further, in some embodiments, the first direction 150 may be perpendicular to the axis of rotation 130A or a deviation from perpendicular that does not cause the aerial vehicle 100 to operate in a significantly different manner from when the first direction 150 is perpendicular to the axis of rotation 130A.

Moreover, in some embodiments, when the aerial vehicle 100 is in forward flight in the first direction 150 and the motor 124A is turned off, the shaft 122A and the motor 124A may each be configured to orient in the second direction 152A.

Figure 1B:
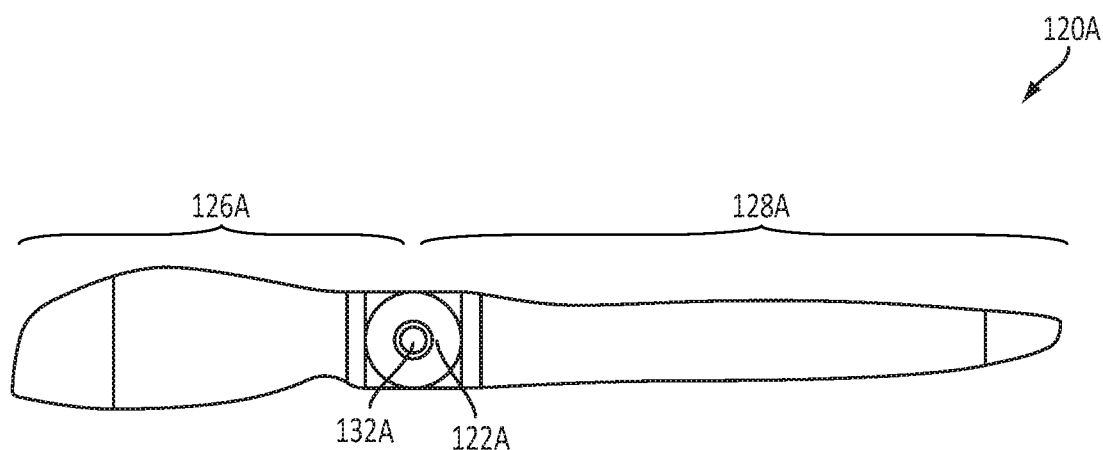
FIG. 1b depicts a top view of a propeller unit, according to an example embodiment.

FIG. 1b depicts a top view of the first propeller unit 120A, according to an example embodiment. In particular, FIG. 1b shows the first propeller unit 120A includes a center of mass 132A. In the illustrated example, the mass of the first propeller blade 126A, the second propeller blade 128A, the shaft 122A, and the motor 124A may each be selected, such that the center of mass 132A is located on the axis of rotation 130A. Accordingly, with this arrangement, the mass of the first propeller blade 126A may be substantially the same as the mass of the second propeller blade 128A. In some embodiments, the mass of the first propeller blade 126A may be the same as the mass of the second propeller blade 128A or a deviation from the same that does not cause the aerial vehicle 100 to operate in a significantly different manner from when the mass of the first propeller blade 126A is the same as the mass of the second propeller blade 128A.

Figure 1C:
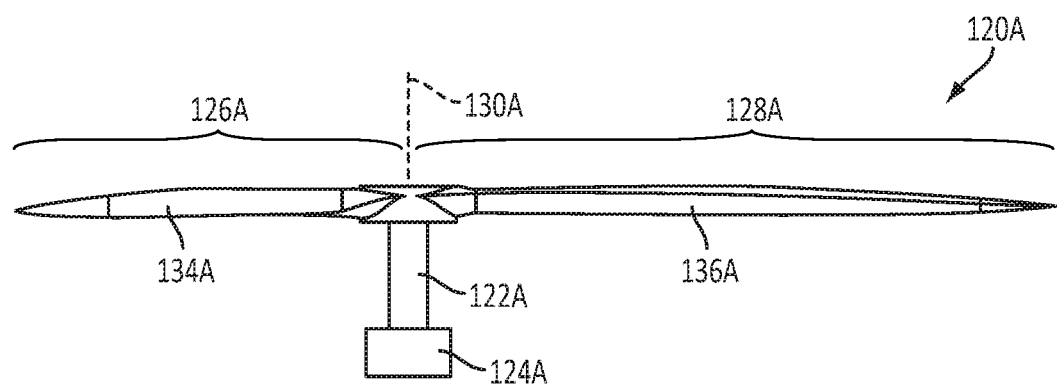
FIG. 1c depicts a side view of a propeller unit, according to an example embodiment.

FIG. 1c depicts a side view of the first propeller unit 120A, according to an example embodiment. In particular, FIG. 1c shows the first propeller blade 126A has a surface area 134A substantially perpendicular to the axis of rotation 130A, and the second propeller blade 128A has a surface area 136A substantially perpendicular to the axis of rotation 130. In the illustrated example, the surface area 136A may be greater than the corresponding surface area 134A. With this arrangement, the first propeller unit 120A may be referred to as asymmetric. In some embodiments, the surface area 134A and/or surface area 136A may be perpendicular to the axis of rotation 130A or a deviation from perpendicular that does not cause the aerial vehicle 100 to operate in a significantly different manner from when the surface area 134A and/or surface area 136A is perpendicular.

In some embodiments, the first propeller blade 126A and the second propeller blade 128A may each be configured to orient in the second direction 152A in response to the wind 170 on the first propeller unit 120A in a third direction that is substantially perpendicular to the axis of rotation 130A (e.g., a direction that is substantially opposite the first direction 150). With this arrangement, the orientation of the first propeller unit 120A in the second direction 152A may be referred to as passive. In some embodiments, the third direction may be perpendicular to the axis of rotation 130A or a deviation from perpendicular that does not cause the aerial vehicle 100 to operate in a significantly different manner from when the third direction is perpendicular to the axis of rotation 130A. Moreover, in some embodiments, the direction may be opposite the first direction 150 or a deviation from opposite that does not cause the aerial vehicle 100 to operate in a significantly different manner from when the direction is opposite the first direction 150.

For instance, in some embodiments, the incident wind on the first propeller unit 120A in the third direction may contact the surface area 134A of the first propeller blade 126A and the surface area 136A of the second propeller blade 128A so as to cause at least in part the first propeller blade 126A and the second propeller blade 128A to orient in the second direction 254A, such that the first propeller blade 126A is substantially upwind of the second propeller blade 128A. In such embodiments, the incident wind in the third direction may apply a greater force on the second propeller blade 128A than on the first propeller blade 126A based at least in part on the surface area 136A of the second propeller blade 128A being greater than the surface area 134A of the first propeller blade 126A.

Moreover, in some embodiments, the shaft 122A and/or the motor 124A may be configured to orient in the second direction 152A in response to the wind 170 on the first propeller unit 120A in the third direction. For instance, in some embodiments, the incident wind contacting the surface area 134A of the first propeller blade 126A and the surface area 136A of the second propeller blade 128A may cause at least in part the shaft 122A and the motor 124A to orient in the second direction 152A.

Returning to FIG. 1a, the second propeller unit 120B may take the form of or be similar in form to the first propeller unit 120A. For example, the second propulsion unit 120B includes a shaft 122B coupled to a motor 124B, and a first propeller blade 126B and a second propeller blade 128B that are both connected to the shaft 122B. The second propeller blade 128B is located substantially opposite the first propeller blade 126B in the same or similar way as the second propeller blade 126B is located substantially opposite the first propeller blade 126A.

In the illustrated example, the motor 124B is connected to the second wing 114. The motor 124B may be connected to the second wing 114 in the same or similar way as the motor 124A is connected to the first wing 112. In addition, the motor 124B may be connected to other portions of the aerial vehicle 100 in the same or similar way as the motor 124A may be connected to other portions of the aerial vehicle 100. Moreover, the motor 124B may be powered by a fuel or one or more batteries in the same or similar way as the motor 124A may be powered.

When the motor 124B is turned on, the motor 124B may drive the shaft 122B so as to rotate the first propeller blade 126B and the second propeller blade 128B around an axis of rotation 130B. With this arrangement, when the motor 124B is turned on, the first propeller blade 126B and the second propeller blade 128B may provide substantially the same thrust along the axis of rotation 130B in the same or similar way that the first propeller blade 126A and the second propeller blade 128A may provide substantially the same thrust. The thrust provided by the first propeller blade 126B and the second propeller blade 128B may contribute to a lift of the aerial vehicle 100 for takeoff and hover flight. In addition, the thrust provided by the first propeller blade 126B and the second propeller blade 128B may contribute to a lift of the aerial vehicle 100 for transitioning between flight modes.

When the aerial vehicle 100 is in forward flight in the first direction 150 and the motor 124B is turned off, the first propeller blade 126B and the second propeller blade 128B may each be configured to orient in a second direction 152B that is substantially parallel to the first direction 150, such that the first propeller blade 126B is oriented substantially upwind of the second propeller blade 128B in the same or similar way as the first propeller blade 126A and the second propeller blade 128A are each configured to orient in the second direction 152A. Moreover, in some embodiments, when the aerial vehicle 100 is in forward flight in the first direction 150 and the motor 124B is turned off, the shaft 122B and the motor 124B may each be configured to orient in the second direction 152B in the same or similar way as the shaft 122A and the motor 124A are each configured to orient in the second direction 152A.

The body 102, the first wing 112, the second wing 114, the one or more propeller units 120, and the one or more propulsion units 140 may include any suitable material which allows the aerial vehicle 100 to engage in hover flight and forward flight. For example, the first propeller blade 126A, the first propeller blade 126B, the second propeller blade 128A, and/or the second propeller blade 128B may include a variety of materials, such as one or more metals (e.g., steel), foam, plastic, carbon fiber, composites, e-glass, etc.

The aerial vehicle 100 may also include in control system 160. The control system 160 is configured to control operation(s) of the aerial vehicle 100 and its components. In some embodiments, the control system 160 may be configured to perform one or more functions described herein. For example, in some embodiments, the first propeller blade 126A and the second propeller blade 128A may be configured to orient in the second direction 152A in response to the control system 160 positioning the first propeller blade 126A and the second propeller blade 128A in the second direction 152A. Similarly, in some embodiments, the first propeller blade 126B and the second propeller blade 128B may be configured to orient in the second direction 152B in response to the control system 160 positioning the first propeller blade 126B and the second propeller blade 128B in the second direction 152B. With this arrangement, the orientation of the first propeller unit 120A and/or the propeller unit 120B may be referred to as active.

Moreover, in some embodiments, the shaft 122A and/or the motor 124A may be configured to orient in the second direction 152A in response to the control system 160 positioning the shaft 122A and the motor 124B in the second direction 152A. Similarly, in some embodiments, the shaft 122B and/or the motor 124B may be configured to orient in the second direction 152B in response to the control system 160 positioning the shaft 122B and the motor 124B in the second direction 152B.

The control system 160 may be implemented with mechanical systems and/or with hardware, firmware, and/or software. As one example, the control system 160 may take the form of program instructions stored on a non-transitory computer readable medium and a processor that executes the instructions. The control system 160 may be implemented in whole or in part on the aerial vehicle 100 and/or at least one entity remotely located from the aerial vehicle 100, such as a ground-station (not shown). Generally, the manner in which the control system 160 is implemented may vary, depending upon the particular application.

In some embodiments, the orientation of the first propeller blade 126A and the second propeller blade 128A in the second direction 152A may reduce drag on the first propeller unit 120A and/or reduce turbulence near the first propeller unit 120A. Moreover, in at least one such embodiment, the orientation of the first propeller blade 126A and the second propeller blade 128A in the second direction 152A may reduce drag on the aerial vehicle 100, reduce instability of the aerial vehicle 100, reduce oscillation of the aerial vehicle 100, and/or reduce disruption of air flow over the aerial vehicle 100.

Moreover, in some embodiments, the orientation of the first propeller blade 126B and the second propeller blade 128B in the second direction 152B may reduce drag on the second propeller unit 120B and/or reduce turbulence near the second propeller unit 120B. Moreover, in at least one such embodiment, the orientation of the first propeller blade 126B and the second propeller blade 128B in the second direction 152B may reduce drag on the aerial vehicle 100, reduce instability of the aerial vehicle 100, reduce oscillation of the aerial vehicle 100, and/or reduce disruption of air flow over the aerial vehicle 100.

Further, in some embodiments, the body 102 of the aerial vehicle 100 may be in a first orientation during takeoff and hover flight, and the body 102 of the aerial vehicle 100 may be in a second orientation that is substantially the same as the first orientation during forward flight. And in at least one such embodiment, the first orientation may be substantially parallel to the ground. In some embodiments, the second orientation may be the same as the first orientation or a deviation from the same that does not cause the aerial vehicle 100 to operate in a significantly different manner from when the second orientation is the same as the first orientation. Moreover, in some embodiments, the first orientation may be parallel to the ground or a deviation from parallel that does not cause the aerial vehicle 100 to operate in a significantly different manner.

Further still, in some embodiments, the aerial vehicle 100 may be a UAV. Herein, the terms "unmanned aerial vehicle" and "UAV" refer to any autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

In some embodiments, the aerial vehicle 100 may be operated by a pilot, such as a physically-present human pilot. And in at least one such embodiment, the aerial vehicle 100 could transport one or more passengers.

Figure 2A:
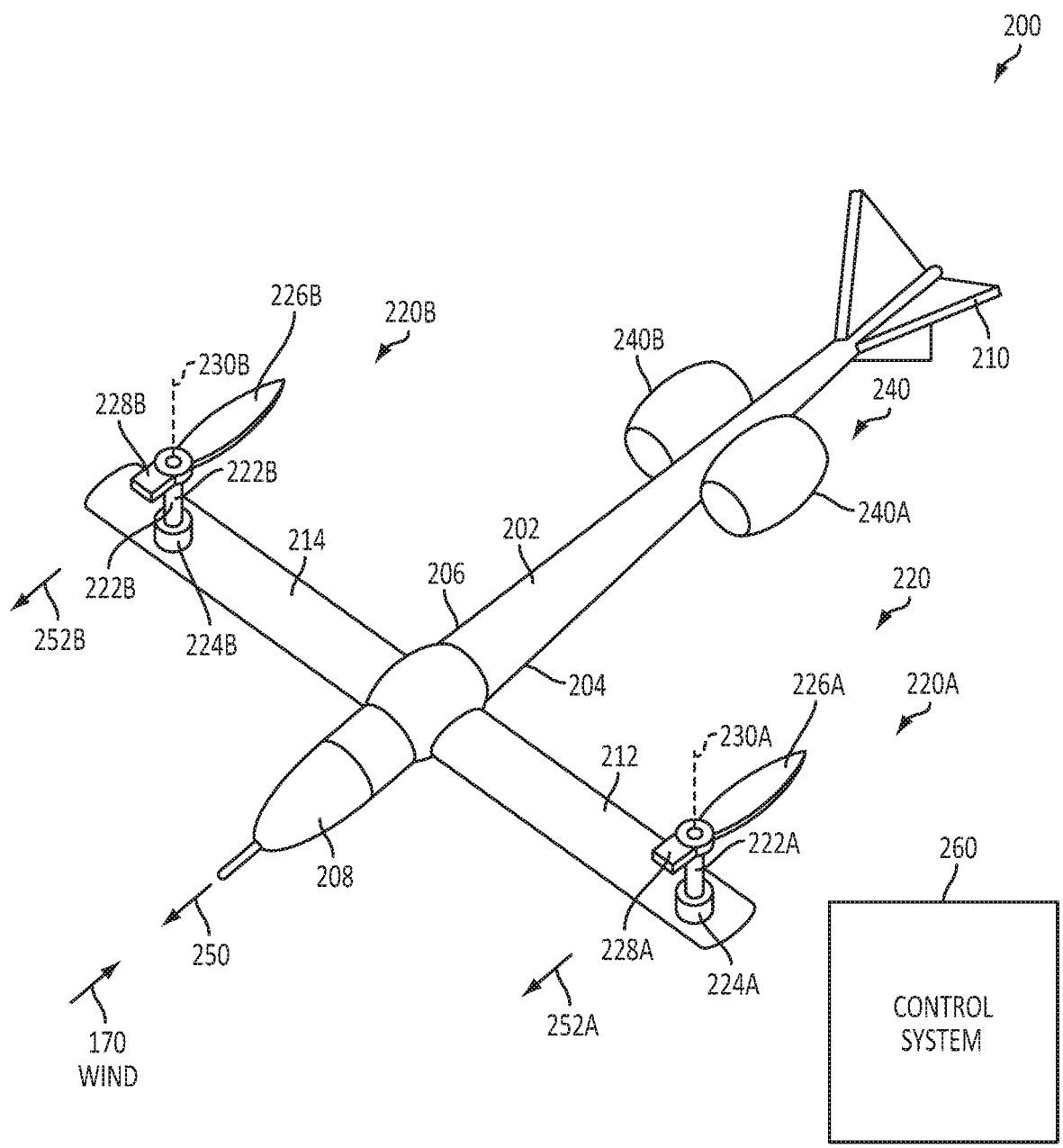
FIG. 2a depicts another aerial vehicle, according to an example embodiment.

FIG. 2a depicts another aerial vehicle 200, according to an example embodiment. In particular, the aerial vehicle 200 includes one or more propeller units 220.

The aerial vehicle 200 also includes a body 202, a first wing 212, a second wing 214, and one or more propulsion units 240. As shown in FIG. 2a, the body 202 includes a first side 204, a second side 206, a front section 208, and a rear section 210. Moreover, as shown in FIG. 2a, the one or more propulsion units 240 includes a first propulsion unit 240A and a second propulsion unit 240B.

The body 202 may take the form of or be similar in form to the body 102, the first wing 212 may take the form of or be similar in form to the first wing 112, the second wing 214 may take the form of or be similar in form to the first wing 114, the one or more propulsion units 240 may take the form of or be similar in form to the one or more propulsion units 140, the first side 204 of the body 202 may take the form of or be similar in form to the first side 104 of the body 102, the second side 206 of the body 202 may take the form of or be similar in form to the second side 106 of the body 102, the front section 208 of the body 202 may take the form of or be similar in form to the front section 108 of the body 102, the rear section 210 of the body 202 may take the form of or be similar in form to the rear section 110 of the body 102, the first propulsion unit 240A may take the form of or be similar in form to the first propulsion unit 140A, and the second propulsion unit 240B may take the form of or be similar in form to the second propulsion unit 140B.

Similarly, the arrangement of the body 202, the first wing 212, the second wing 214, the first side 204 of the body 202, the second side 206 of the body 202, the front section 208 of the body 202, the rear section 210 of the body 202, the first propulsion unit 240A, and the second propulsion unit 240B in the aerial vehicle 200 may be the same as or similar to the arrangement of the body 102, the first wing 112, the second wing 114, the first side 104 of the body 102, the second side 106 of the body 102, the front section 108 of the body 102, the rear section 110 of the body 102, the first propulsion unit 140A, and the second propulsion unit 140B in the aerial vehicle 100.

In the illustrated example, the one or more propeller units 220 include two propeller units, a first propeller unit 220A and a second propeller unit 220B. However, in other examples, the one or more propeller units 220 may include one propeller unit or more than two propeller units, such as three propeller units, four propeller units, five propeller units, ten propeller units, twenty propeller units, etc. For instance, in some examples, the one or more propeller units 220 may include between two and twenty propeller units.

The first propeller unit 220A includes a shaft 222A coupled to a motor 224A, and a propeller blade 226A and a weight 228A that are both connected to the shaft 222A. The weight 228A is located substantially opposite the propeller blade 226A. In some embodiments, the weight 228A may be located opposite the propeller blade 226A or a deviation from opposite that does not cause the aerial vehicle 200 to operate in a significantly different manner from when the weight 228A is located opposite the propeller blade 226A.

In the illustrated example, the motor 224A is connected to the first wing 212. The motor 224A may be connected to the first wing 212 in the same or similar way as the motor 124A is connected to the first wing 112. In addition, the motor 224A may be connected to other portions of the aerial vehicle 200 in the same or similar way as the motor 124A may be connected to other portions of the aerial vehicle 100.

Moreover, the motor 224A may be powered by a fuel or one or more batteries in the same or similar way as the motor 124A is powered.

When the motor 224A is turned on, the motor 224A may drive the shaft 222A so as to rotate the propeller blade 226A and the weight 228A around an axis of rotation 230A. With this arrangement, when the motor 224A is turned on, the propeller blade 226A may provide thrust along the axis of rotation 230A. The thrust provided by the propeller blade 226A may contribute to a lift of the aerial vehicle 200 for takeoff and hover flight. In addition, the thrust provided by the propeller blade 226A may contribute to a lift of the aerial vehicle 200 for transitioning between flight modes. In some embodiments, when the motor 224A is turned on, the weight 228A may provide substantially no thrust along the axis of rotation 230A. In some embodiments, the weight 228A may provide no thrust or a deviation from no that does not cause the aerial vehicle 200 to operate in a significantly different manner from when the weight 228 provides no thrust.

Moreover, in some embodiments, when the motor 224A is turned on, the propeller blade 226A and the weight 228A may provide thrust along the axis of rotation 230A, and the thrust provided by the propeller blade 226A may be greater than the thrust provided by the weight 228A. In such embodiments, the thrust provided by the propeller blade 226A and the weight 228A may contribute to a lift of the aerial vehicle 200 for takeoff and hover flight.

As shown in FIG. 2a, the aerial vehicle 200 may fly above ground into the wind 170. When the aerial vehicle 200 is in forward flight in a first direction 250 and the motor 224A is turned off, the propeller blade 226A and the weight 228A may each be configured to orient in a second direction 252A that is substantially parallel to the first direction 250, such that the weight 228A is oriented substantially upwind of the propeller blade 226A. In some embodiments, the second direction 252A may be parallel to the first direction 250 or a deviation from a parallel that does not cause the aerial vehicle 200 to operate in a significantly different manner from when the second direction 252A is parallel to the first direction 250. Moreover, in some embodiments, the weight 228A may be oriented upwind of the propeller blade 226A or a deviation from upwind that does not cause the aerial vehicle 200 to operate in a significantly different manner from when the weight 228A is oriented upwind of the propeller blade 226A.

In some embodiments, the first direction 250 may be substantially perpendicular to the axis of rotation 230A. Further, in some embodiments, the first direction 250 may be perpendicular to the axis of rotation 230A or a deviation from perpendicular that does not cause the aerial vehicle 200 to operate in a significantly different manner from when the first direction 250 is perpendicular to the axis of rotation 230A. Moreover, in some embodiments, when the aerial vehicle 200 is in forward flight in the first direction 250 and the motor 224A is turned off, the shaft 222A and the motor 224A may each be configured to orient in the second direction 252A.

Figure 2B:
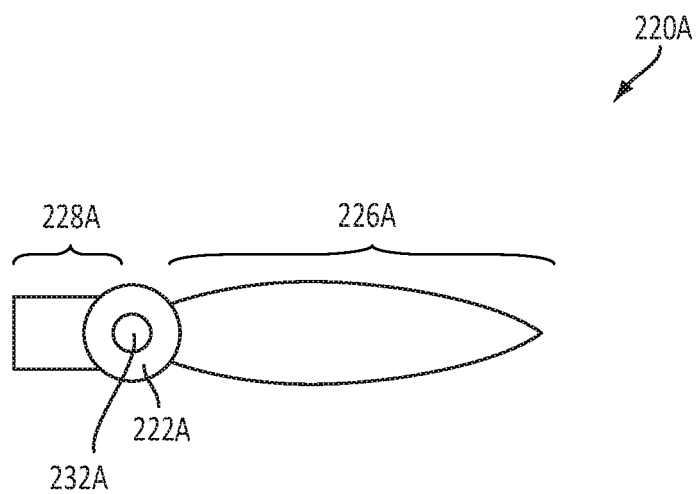
FIG. 2b depicts a top view of another propeller unit, according to an example embodiment.

FIG. 2b depicts a top view of the first propeller unit 220A, according to an example embodiment. In particular, FIG. 2b shows the first propeller unit 220A includes a center of mass 232A. In the illustrated example, the mass of the propeller blade 226A, the weight 228A, the shaft 222A, and the motor 224A may each be selected, such that the center of mass 232A is located on the axis of rotation 230A. Accordingly, with this arrangement, the mass of the propeller blade 226A may be substantially the same as the mass of the weight 228A. In some embodiments, the mass of the propeller blade 226A may be the same as the mass of the weight 228A or a deviation from the same that does not cause the aerial vehicle 200 to operate in a significantly different manner from when the mass of the propeller blade 226A is the same as the mass of the weight 228A.

Figure 2C:
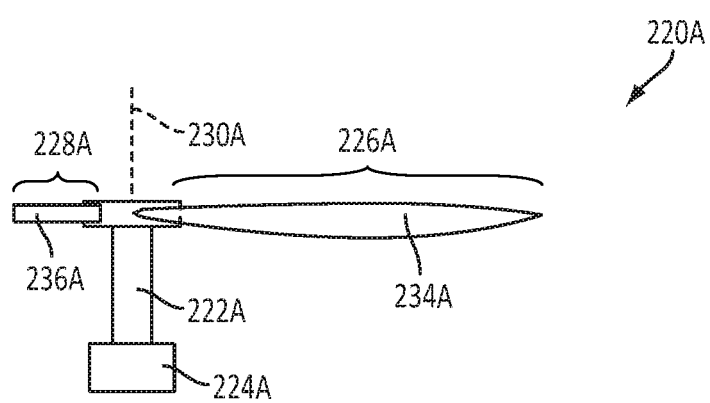
FIG. 2c depicts a side view of another propeller unit, according to an example embodiment.

FIG. 2c depicts a side view of the first propeller unit 220A, according to an example embodiment. In particular, FIG. 2c shows the propeller blade 226A has a surface area 234A substantially perpendicular to the axis of rotation 230A, and the weight 228A has a surface area 236A substantially perpendicular to the axis of rotation 230A. In the illustrated example, the surface area 234A may be greater than the corresponding surface area 236A. With this arrangement, the propeller unit 220A may be referred to as asymmetric. In some embodiments, the surface area 234A and/or surface area 236A may be perpendicular to the axis of rotation 230A or a deviation from perpendicular that does not cause the aerial vehicle 200 to operate in a significantly different manner from when the surface area 234A and/or surface area 236A is perpendicular.

In some embodiments, the propeller blade 226A and the weight 228A may each be configured to orient in the second direction 252A in response to the wind 170 on the first propeller unit 220A in a third direction that is substantially perpendicular to the axis of rotation 230A (e.g., a direction that is substantially opposite the first direction 250). With this arrangement, the orientation of the first propeller unit 220A in the second direction 252A may be referred to as passive. In some embodiments, the third direction may be perpendicular to the axis of rotation 230A or a deviation from perpendicular that does not cause the aerial vehicle 200 to operate in a significantly different manner from when the third direction is perpendicular to the axis of rotation 230A. Moreover, in some embodiments, the direction may be opposite the first direction 250 or a deviation from opposite that does not cause the aerial vehicle 200 to operate in a significantly different manner from when the direction is opposite the first direction 250.

For instance, in some embodiments, the incident wind on the propeller unit 220A in the third direction may contact the surface area 234A of the propeller blade 226A and the surface area 236A of the weight 228A so as to cause at least in part the propeller blade 226A and the weight 228A to orient in the second direction 254A, such that the weight 228A is substantially upwind of the propeller blade 226A. In such embodiments, the incident wind in the third direction may apply a greater force on the propeller blade 226A than on the weight 228A based at least in part on the surface area 234A of the propeller blade 226A being greater than the surface area 236A of the weight 228A.

Moreover, in some embodiments, the shaft 222A and/or the motor 224A may be configured to orient in the second direction 252A in response to the wind 170 on the first propeller unit 220A in the third direction. For instance, in some embodiments, the incident wind contacting the surface area 234A of the propeller blade 226A and the surface area 236A of the weight 228A may cause at least in part the shaft 222A and/or the motor 224A to orient in the second direction 252A.

Returning to FIG. 2a, the second propeller unit 220B may take the form of or be similar in form to the first propeller unit 220A. For example, the second propulsion unit 220B includes a shaft 222B coupled to a motor 224B, and a propeller blade 226B and weight 228B that are both connected to the shaft 222B. The weight 228B is located substantially opposite the propeller blade 226B in the same or similar way as the weight 228A is located substantially opposite the propeller blade 226A.

In the illustrated example, the motor 224B is connected to the second wing 214. The motor 224B may be connected to the second wing 214 in the same or similar way as the motor 224A is connected to the first wing 212. In addition, the motor 224B may be connected to other portions of the aerial vehicle 200 in the same or similar way as the motor 224A may be connected to other portions of the aerial vehicle 200. Moreover, the motor 224B may be powered by a fuel or one or more batteries in the same or similar way as the motor 224A may be powered.

When the motor 224B is turned on, the motor 224B may drive the shaft 222B so as to rotate the propeller blade 226B and the weight 228B around an axis of rotation 230B. With this arrangement, when the motor 224B is turned on, the propeller blade 226B may provide thrust along the axis of rotation 230B. The thrust provided by the propeller blade 226B may contribute to a lift of the aerial vehicle 200 for takeoff and hover flight. In some embodiments, when the motor 224B is turned on, the weight 228B may provide substantially no thrust along the axis of rotation 230B in the same or similar way the weight 228A may provide substantially no thrust along the axis of rotation 230A. Moreover, in some embodiments, when the motor 224B is turned on, the propeller blade 226B and the weight 228B may provide thrust along the axis of rotation 230B, and the thrust provided by the propeller blade 226B may be greater than the thrust provided by the weight 228B. In such embodiments, the thrust provided by the propeller blade 226B and the weight 228B may contribute to a lift of the aerial vehicle 200 for takeoff and hover flight.

When the aerial vehicle 200 is in forward flight in the first direction 250 and the motor 224B is turned off, the propeller blade 226B and the weight 228B may each be configured to orient in a second direction 252B that is substantially parallel to the first direction 250, such that the weight 228B is oriented substantially upwind of the propeller blade 228A in the same or similar way as the propeller blade 226A and the weight 228A are each configured to orient in the second direction 252A. Moreover, in some embodiments, when the aerial vehicle 200 is in forward flight in the first direction 250 and the motor 224B is turned off, the shaft 222B and/or the motor 224B may be configured to orient in the second direction 252B in the same or similar way as the shaft 222A and/or the motor 224A are configured to orient in the second direction 252A.

The body 202, the first wing 212, the second wing 214, the one or more propeller units 220, and the one or more propulsion units 240 may include any suitable material which allows the aerial vehicle 200 to engage in hover flight and forward flight. For example, the propeller blade 226A and/or the propeller blade 226B may include any of the materials that the first propeller blade 126A, the second propeller blade 128A, the first propeller blade 126B, and/or the second propeller blade 128B may include. In addition, the weight 228A and/or the weight 228B may include a variety of materials, such as one or more metals (e.g., steel) and lead.

The aerial vehicle 200 may also include in control system 260. The control system 260 is configured to control operation(s) of the aerial vehicle 200 and its components. In some embodiments, the control system 260 may be configured to perform one or more functions described herein. For example, in some embodiments, the first propeller blade 226A and the second propeller blade 228A may be configured to orient in the second direction 252A in response to the control system 260 positioning the propeller blade 226A and the weight 228A in the second direction 252A. Similarly, in some embodiments, the propeller blade 226B and the weight 228B may be configured to orient in the second direction 252B in response to the control system 260 positioning the propeller blade 226B and the weight 228B in the second direction 252B. With this arrangement, the orientation of the propeller unit 220A and/or the propeller unit 220B may be referred to as active. The control system 260 may take the form of or be similar in form to the control system 160.

Moreover, in some embodiments, the shaft 222A and/or the motor 224A may be configured to orient in the second direction 252A in response to the control system 260 positioning the shaft 222A and the motor 224B in the second direction 252A. Similarly, in some embodiments, the shaft 222B and the motor 224B may be configured to orient in the second direction 252B in response to the control system 260 positioning the shaft 222B and the motor 224B in the second direction 252B.

In some embodiments, the orientation of the propeller blade 226A and the weight 228A in the second direction 252A may reduce drag on the first propeller unit 220A and/or reduce turbulence near the first propeller unit 220A. Moreover, in at least one such embodiment, the orientation of the propeller blade 226A and the weight 228A in the second direction 252A may reduce drag on the aerial vehicle 200, reduce instability of the aerial vehicle 200, reduce oscillation of the aerial vehicle 200, and/or reduce disruption of air flow over the aerial vehicle 200.

Moreover, in some embodiments, the orientation of the propeller blade 226B and the weight 228B in the second direction 252B may reduce drag on the first propeller unit 220B and/or reduce turbulence near the first propeller unit 220B. Moreover, in at least one such embodiment, the orientation of the propeller blade 226B and the weight 228B in the second direction 252B may reduce drag on the aerial vehicle 200, reduce instability of the aerial vehicle 200, reduce oscillation of the aerial vehicle 200, and/or reduce disruption of air flow over the aerial vehicle 200.

Further, in some embodiments, the body 202 of the aerial vehicle 200 may be in a first orientation during takeoff and hover flight, and the body 202 of the aerial vehicle 200 may be in a second orientation that is substantially the same as the first orientation during forward flight. And in at least one such embodiment, the first orientation may be substantially parallel to the ground. In some embodiments, the second orientation may be the same as the first orientation or a deviation from the same that does not cause the aerial vehicle 200 to operate in a significantly different manner from when the second orientation is the same as the first orientation. Moreover, in some embodiments, the first orientation may be parallel to the ground or a deviation from parallel that does not cause the aerial vehicle 200 to operate in a significantly different manner from when the first orientation is parallel to the ground.

Further still, in some embodiments, the aerial vehicle 200 may be a UAV. Further, in some embodiments, the aerial vehicle 200 may be operated by a pilot, such as a physically-present human pilot. And in at least one such embodiment, the aerial vehicle 200 could transport one or more passengers.

Figure 3A:
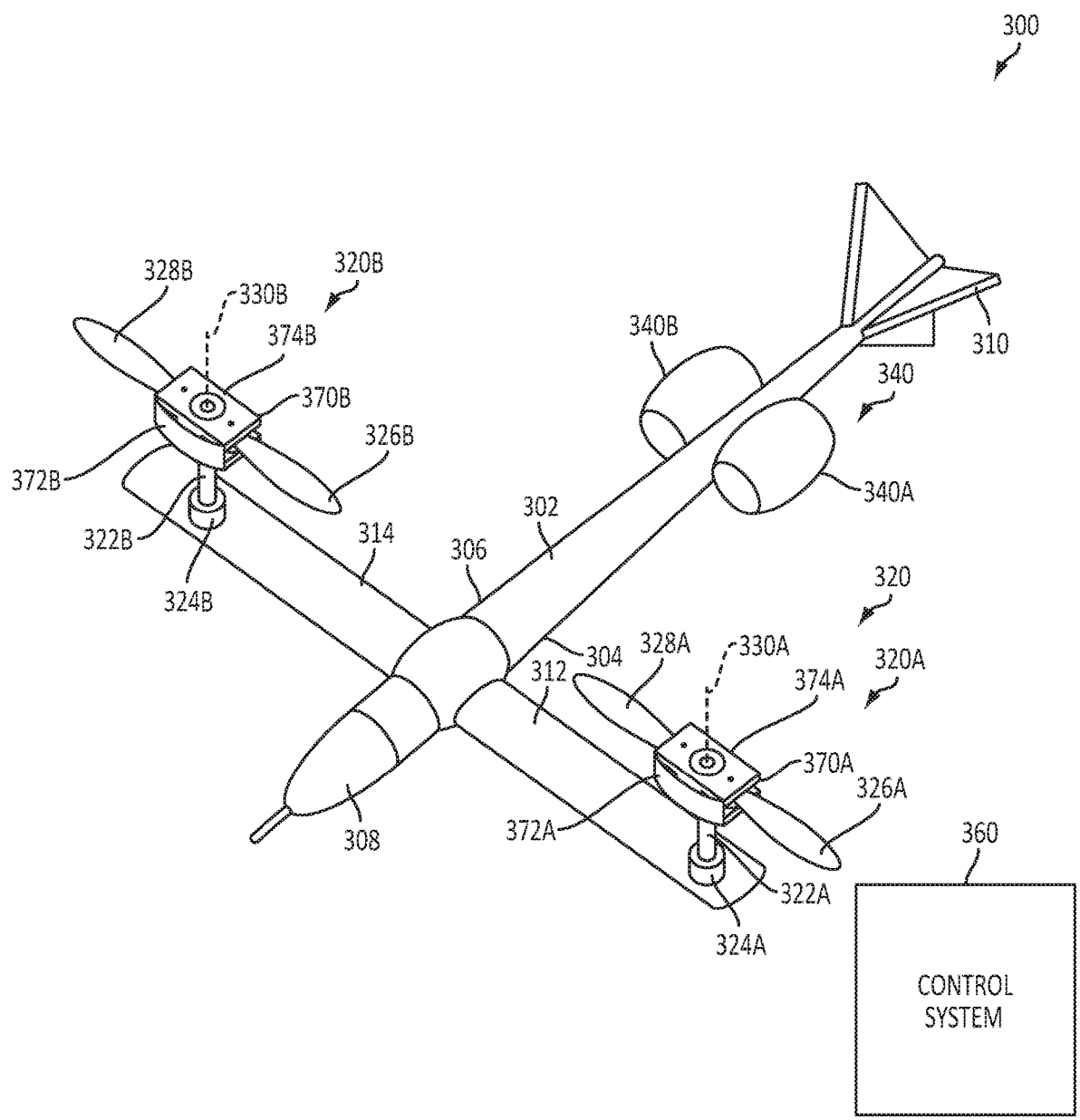
FIGS. 3a and 3b depict yet another aerial vehicle, according to an example embodiment.
Figure 3B:
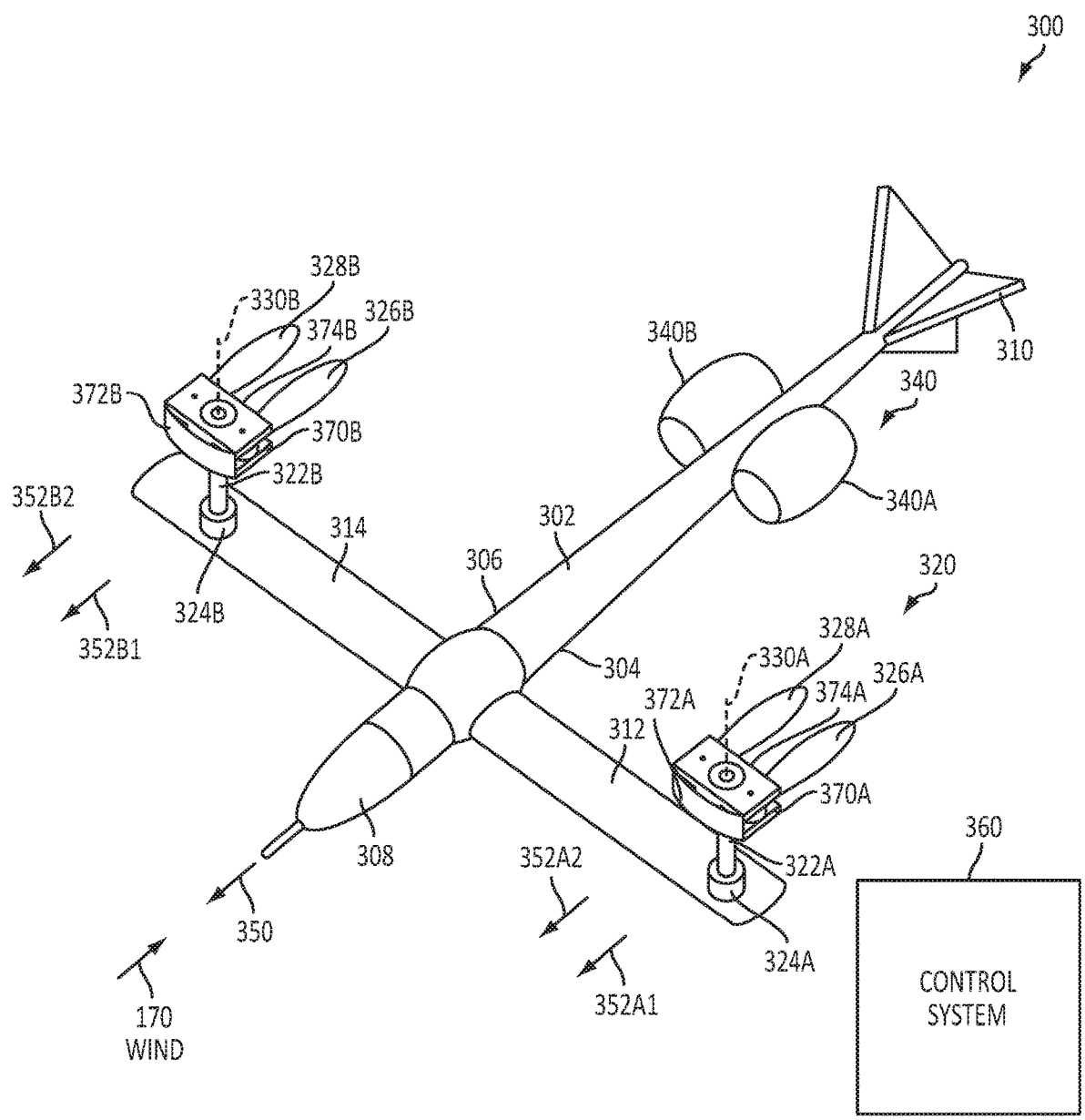

FIGS. 3a and 3b depict another aerial vehicle 300, according to an example embodiment. In particular, the aerial vehicle 300 includes one or more propeller units 320.

The aerial vehicle 300 also includes a body 302, a first wing 312, a second wing 314, and one or more propulsion units 340. As shown in FIGS. 3a and 3b, the body 302 includes a first side 304, a second side 306, a front section 308, and a rear section 310. Moreover, as shown in FIGS. 3a and 3b, the one or more propulsion units 340 includes a first propulsion unit 340A and a second propulsion unit 340B.

The body 302 may take the form of or be similar in form to the body 102 and/or the body 202, the first wing 312 may take the form of or be similar in form to the first wing 112 and/or the first wing 212, the second wing 314 may take the form of or be similar in form to the first wing 114 and/or the first wing 214, the one or more propulsion units 340 may take the form of or be similar in form to the one or more propulsion units 140 and/or the one or more propulsion units 240, the first side 304 of the body 302 may take the form of or be similar in form to the first side 104 of the body 102 and/or the first side 204 of the body 202, the second side 306 of the body 302 may take the form of or be similar in form to the second side 106 of the body 302 and/or the second side 206 of the body 202, the front section 308 of the body 302 may take the form of or be similar in form to the front section 108 of the body 102 and/or the front section 208 of the body 202, the rear section 310 of the body 302 may take the form of or be similar in form to the rear section 110 of the body 102 and/or the rear section 210 of the body 202, the first propulsion unit 340A may take the form of or be similar in form to the first propulsion unit 140A and/or the first propulsion unit 240A, and the second propulsion unit 340B may take the form of or be similar in form to the second propulsion unit 140B and/or the second propulsion unit 240B.

Similarly, the arrangement of the body 302, the first wing 312, the second wing 314, the first side 304 of the body 302, the second side 306 of the body 302, the front section 308 of the body 302, the rear section 310 of the body 302, the first propulsion unit 340A, and the second propulsion unit 340B in the aerial vehicle 300 may be the same as or similar to the arrangement of the body 102, the first wing 112, the second wing 114, the first side 104 of the body 102, the second side 106 of the body 102, the front section 108 of the body 102, the rear section 110 of the body 102, the first propulsion unit 140A, and the second propulsion unit 140B in the aerial vehicle 100 and/or the body 202, the first wing 212, the second wing 214, the first side 204 of the body 202, the second side 206 of the body 202, the front section 208 of the body 202, the rear section 210 of the body 202, the first propulsion unit 240A, and the second propulsion unit 240B in the aerial vehicle 200.

In the illustrated example, the one or more propeller units 320 include two propeller units, a first propeller unit 320A and a second propeller unit 320B. However, in other examples, the one or more propeller units 320 may include one propeller unit or more than two propeller units, such as three propeller units, four propeller units, five propeller units, ten propeller units, twenty propeller units, etc. For instance, in some examples, the one or more propeller units 320 may include between two and twenty propeller units.

The first propeller unit 320A includes a shaft 322A coupled to a motor 324A, a hub 370A connected to the shaft 322A, and a first propeller blade 326A and a second propeller blade 328A that are both connected to the hub 370A. The hub 370A includes a first end 372A and a second end 374A.

In the illustrated example, the motor 324A is connected to the first wing 312. The motor 324A may be connected to the first wing 312 in the same or similar way as the motor 124A is connected to the first wing 112 and/or the motor 224A is connected to the first wing 212. In addition, the motor 324A may be connected to other portions of the aerial vehicle 300 in the same or similar way as the motor 124A may be connected to other portions of the aerial vehicle 100 and/or the motor 224A may be connected to other portions of the aerial vehicle 200. Moreover, the motor 324A may be powered by a fuel or one or more batteries in the same or similar way as the motor 124A is powered and/or the motor 224A is powered.

As shown in FIG. 3a, the second propeller blade 328A may be substantially opposite the first propeller blade 326A. In some embodiments, the second propeller blade 328A may be opposite the first propeller blade 326A or a deviation from opposite that does not cause the aerial vehicle 300 to operate in a significantly different manner from when the second propeller blade 328A is opposite the first propeller blade 326A. When the motor 324A is turned on, the motor 324A may drive the shaft 322A so as to rotate the first propeller blade 326A and the second propeller blade 328A around an axis of rotation 330A. With this arrangement, when the motor 324A is turned on and the second propeller blade 328A is substantially opposite the first propeller blade 326A, the first propeller blade 326A and the second propeller blade 328A may provide substantially the same thrust along the axis of rotation 330A. The thrust provided by the first propeller blade 326A and the second propeller blade 328A may contribute to a lift of the aerial vehicle 300 for takeoff and hover flight.

As shown in FIG. 3b, the aerial vehicle 300 may fly above ground into the wind 170. When the aerial vehicle 300 is in forward flight in a first direction 350 and the motor 324A is turned off, the first propeller blade 326A may be configured to orient in a second direction 352A1 that is substantially parallel to the first direction 350 and the second propeller blade 328A may be configured to orient in a third direction 352A2 that is substantially parallel to the first direction 350. In some embodiments, the second direction 352A1 may be parallel to the first direction 350 or a deviation from parallel that does not cause the aerial vehicle 300 to operate in a significantly different manner from when the second direction 352A1 is parallel to the first direction 350. Moreover, in some embodiments, the third direction 352A2 may be parallel to the first direction 350 or a deviation from parallel that does not cause the aerial vehicle 300 to operate in a significantly different manner from when the third direction 352A2 is parallel to the first direction 350.

In addition, in some embodiments, when the aerial vehicle 300 is in forward flight in the first direction 350 and the motor 324A is turned off, the hub 370A may be configured to orient in a direction that is substantially parallel to the first direction 350, such that the first end 372A of the hub 370A is substantially upwind of the second end 374A of the hub 370A. Accordingly, in such embodiments, the first propeller blade 326A may be configured to orient in the second direction 352A1 and the second propeller blade 328A may be configured to orient in the third direction 352A2, such that the first propeller blade 326A and the second propeller blade 328A are each oriented substantially downwind of the first end 372A of the hub 370A.

In some embodiments, the direction may be parallel to the first direction 350 or a deviation from parallel that does not cause the aerial vehicle 300 to operate in a significantly different manner from when the direction is parallel to the first direction 350. Moreover, in some embodiments, the first end 372A of the hub 370A may be oriented upwind of the second end 374A of the hub 370A or a deviation from upwind that does not cause the aerial vehicle 300 to operate in a significantly different manner from when the first end 372A of the hub 370A is oriented upwind of the second end 374A of the hub 370A. Further, in some embodiments, the first propeller blade 326A and the second propeller blade 328A may be oriented downwind of the first end 372A of the hub 370A or a deviation from downwind that does not cause the aerial vehicle 300 to operate in a significantly different manner from when first propeller blade 326A and the second propeller blade 328A are oriented downwind of the first end 372A of the hub 370A.

In some embodiments, the first end 372A of the hub 370A may have a lower coefficient of drag than a coefficient of drag of the second end 374A of the hub 370A. The coefficient of drag of the first end 372A of the hub 370A may refer to drag on the first end 372A of the hub 370A, and the coefficient of drag of the second end 374A of the hub 370A may refer to drag on the second end 374A of the hub 370A.

Moreover, in some embodiments, the first direction 350 may be substantially perpendicular to the axis of rotation 330A. In some embodiments, the first direction 350 may be perpendicular to the axis of rotation 330A or a deviation from perpendicular that does not cause the aerial vehicle 300 to operate in a significantly different manner from when the first direction 350 is perpendicular to the axis of rotation 330A. Moreover, in some embodiments, when the aerial vehicle 300 is in forward flight in the first direction 350 and the motor 324A is turned off, the shaft 322A and the motor 324A may each be configured to orient in a direction that is substantially parallel to the first direction 350.

Figure 3C:
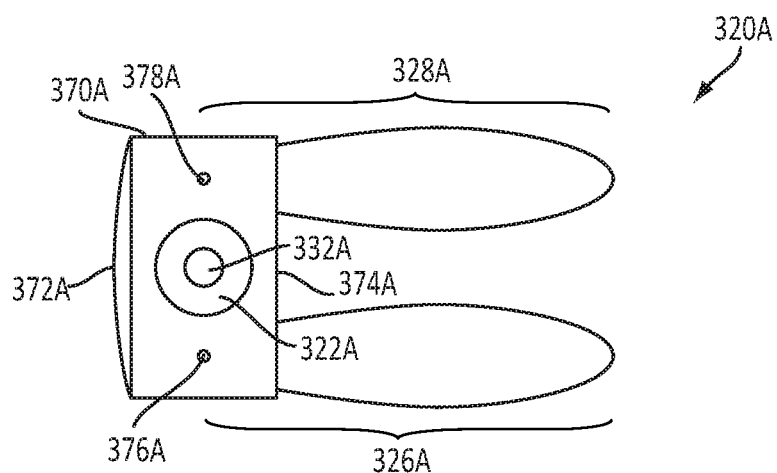
FIG. 3c depicts a top view of yet another propeller unit, according to an example embodiment.

FIG. 3c depicts a top view of the first propeller unit 320A, according to an example embodiment. In particular, FIG. 3c shows the first propeller unit 320A includes a center of mass 332A. In the illustrated example, the mass of the first propeller blade 326A, the second propeller blade 328A, the hub 370A, the shaft 322A, and the motor 324A may each be selected, such that the center of mass 332A is located on the axis of rotation 330A. Accordingly, with this arrangement, the mass of the first propeller blade 326A may be substantially the same as the mass of the second propeller blade 328A. The mass of the first propeller blade 326A may be the same as the mass of the second propeller blade 328A or a deviation from the same that does not cause the aerial vehicle 300 to operate in a significantly different manner from when the mass of the first propeller blade 326A is the same as the mass of the second propeller blade 328A.

Moreover, FIG. 3c shows the first propeller unit 320 also includes a first hub axis 376A and a second hub axis 378A. The first propeller blade 326A may be configured to rotate around the first hub axis 376A, and the second propeller blade 328A may be configured to rotate around the second hub axis 378A.

In particular, the first propeller blade 326A may be configured to rotate around the first hub axis 376A to change its position as shown in FIG. 3a to the position shown in FIG. 3b, and the second propeller blade 378A may be configured to rotate around the second hub axis 328A to change its position as shown in FIG. 3a to the position shown in FIG. 3b. For instance, when aerial vehicle 300 is in forward flight in the first direction 350 and the motor 324A is turned off, the first propeller blade 326A may be configured to rotate around the first hub axis 376A so as to orient in the second direction 352A1. Similarly, when the aerial vehicle 300 is in forward flight in the first direction 350 and the motor 324A is turned off, the second propeller blade 328A may be configured to rotate around the second hub axis 378A so as to orient in the third direction 352A2. In some embodiments, the axis of rotation 330A may be parallel to the first hub axis 376A and/or the second hub axis 378A.

Figure 3D:
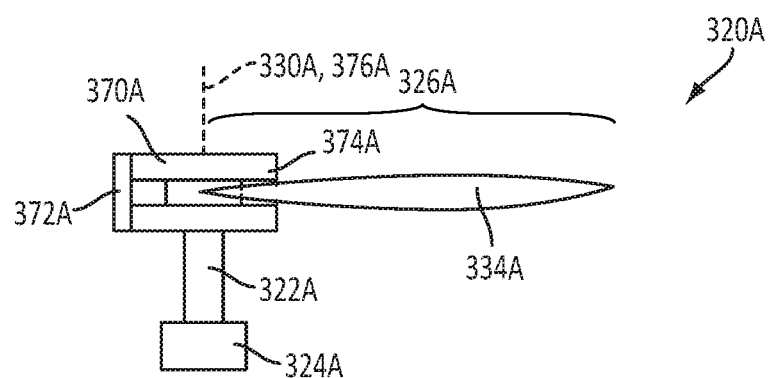
FIG. 3d depicts a side view of yet another propeller unit, according to an example embodiment.

FIG. 3d depicts a side view of the first propeller unit 320A, according to an example embodiment. In particular, FIG. 3d shows the first propeller blade 326A has a surface area 334A substantially perpendicular to the axis of rotation 330A and the first hub axis 376A. In some embodiments, the surface area 334A may be perpendicular to the axis of rotation 330A or a deviation from perpendicular that does not cause the aerial vehicle 300 to operate in a significantly different manner from when the surface area 334A is perpendicular.

In some embodiments, the first propeller blade 326A may be configured to orient in the second direction 352A1 in response to wind 170 on the first propeller unit 320A in a fourth direction that is substantially perpendicular to the axis of rotation 330A and the first hub axis 376A (e.g., a direction that is substantially opposite the first direction 350). With this arrangement, the orientation of the first propeller blade 326A in the second direction 352A1 may be referred to as passive. In some embodiments, the fourth direction may be perpendicular to the axis of rotation 330A and the first hub axis 376A or a deviation from a perpendicular that does not cause the aerial vehicle 300 to operate in a significantly different manner from when the fourth direction is perpendicular to the axis of rotation 330A and the first hub axis 376A. Moreover, in some embodiments, the direction may be opposite the first direction 350 or a deviation from opposite that does not cause the aerial vehicle 300 to operate in a significantly different manner from when the direction is opposite the first direction 350.

For instance, in some embodiments, the incident wind on the propeller unit 320A in the fourth direction may contact the surface area 334A of the first propeller blade 326A so as to cause at least in part the first propeller blade 326A to rotate around the first hub axis 376A so as to orient in the second direction 352A1.

Moreover, in some embodiments, the second propeller blade 328A may be configured to orient in the third direction 352A2 in response to wind 170 on the first propeller unit 320A in the fourth direction. With this arrangement, the orientation of the second propeller blade 328A in the third direction 352A2 may be referred to as passive.

For instance, in some embodiments, the incident wind on the propeller unit 320A in the fourth direction may contact a surface area (not shown) of the second propeller blade 328A substantially perpendicular to the axis of rotation 330A and the second hub axis 378A so as to cause at least in part the second propeller blade 328A to rotate around the second hub axis so as to orient in the third direction 352A2. The surface area may be substantially perpendicular in the same or similar way as the surface area 334A may be substantially perpendicular.

Moreover, in some embodiments, the hub 370A may be configured to be orient in the direction that is substantially parallel to the first direction 350, such that the first end 372A of the hub 370A is substantially upwind of the second end 374A of the hub 370A in response to wind 170 on the first propeller unit 320A in the fourth direction. For instance, in some embodiments, the incident wind contacting the surface area 334A of the first propeller blade 326A and the surface area of the second propeller blade 328A may cause at least in part the hub 370A to orient in the direction that is substantially parallel to the first direction 350, such that the first end 372A of the hub 370A is substantially upwind of the second end 374A of the hub 370A. In some embodiments, the first end 372A of the hub 370A is upwind of the second end 374A of the hub 370A or a deviation from upwind that does not cause the aerial vehicle 300 to operate in a significantly different manner from when the first end 372A of the hub 370A is upwind of the second end 374A of the hub 370A.

Further, in some embodiments, the shaft 322A and/or the motor 324A may be configured to orient in the direction that is substantially parallel to the first direction 350 in response to wind 170 on the first propeller unit 320A in the fourth direction. For instance, in some embodiments, the incident wind contacting the surface area 334A of the first propeller blade 326A and the surface area of the second propeller blade 328A may cause at least in part the shaft 322A and/or the motor 324A to orient in the direction that is substantially parallel to the first direction 350. In some embodiments, the direction is parallel to the first direction 350 or a deviation from parallel that does not cause the aerial vehicle 300 to operate in a significantly different manner from when the direction is parallel to the first direction 350.

Moreover, in some embodiments, when the aerial vehicle 300 is in forward flight in the first direction 350 and the motor 324A is turned off, the first propeller blade 326A may be configured to rotate to increase a first angle between the first propeller blade 326A and an axis defined by the first direction 350 and the second propeller blade 328A may be configured to rotate to increase a second angle between the second propeller blade 328A and the axis defined by the first direction 350. With this arrangement, the first propeller blade 326A may rotate to a position between the position of the first propeller blade 326A shown in FIG. 3a and the position of the first propeller blade 326A shown in FIG. 3b; and the second propeller blade 328A may rotate to a position between the position of the second propeller blade 328A shown in FIG. 3a and the position of the second propeller blade 328A shown in FIG. 3b.

Figure 3E:
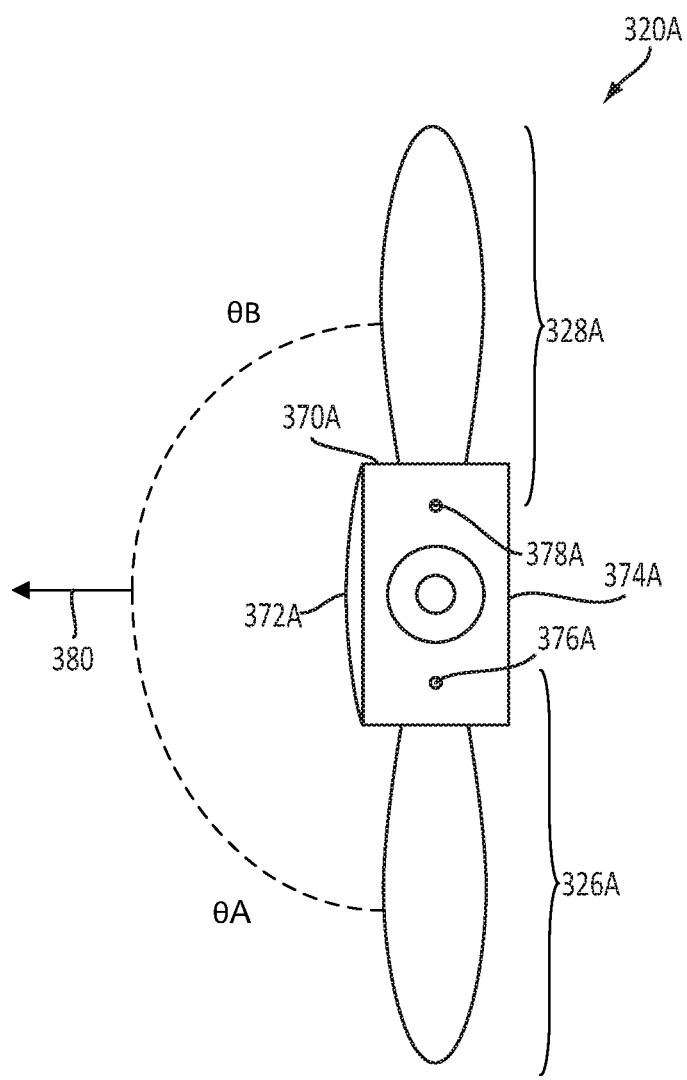
FIG. 3e depicts another top view of a propeller unit, according to an example embodiment.
Figure 3F:
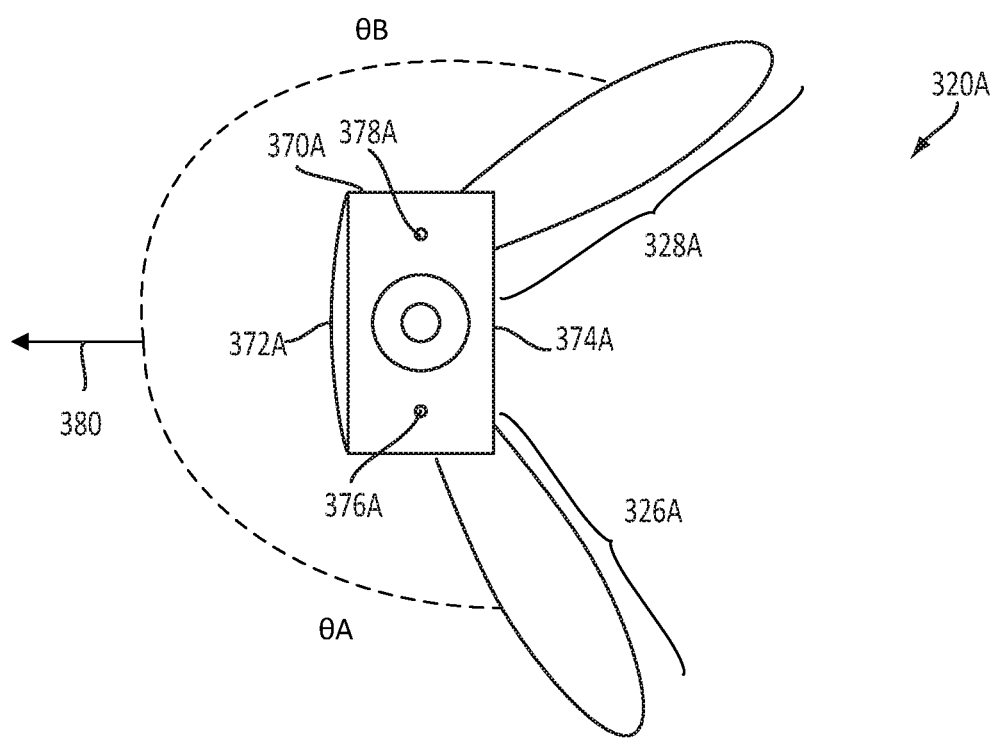
FIG. 3f depicts yet another top view of a propeller unit, according to an example embodiment.

FIGS. 3e and 3f show a top view of the first propeller unit 320A. In particular, FIGS. 3e and 3f show an axis 380 and a first angle θA between the first propeller 326A and the axis 380 and a second angle θB between the second propeller 328A and the axis 380. In some embodiments, the axis 380 may be defined by the first direction 350 (e.g., the axis 380 may be substantially parallel to the first direction 350). In some embodiments, the axis 380 may be parallel to the first direction 350 or a deviation from parallel that does not cause the aerial vehicle 300 to operate in a significantly different manner from when the axis 380 is parallel to the first direction 350.

As shown in FIG. 3f, when the aerial vehicle 300 is in forward flight and the motor 324A is turned off, the first propeller blade 326A may be configured to rotate from the position shown in FIG. 3e to increase θA and the second propeller blade 328A may be configured to rotate from the position shown in FIG. 3e to increase θB.

In some embodiments, the first propeller blade 326A may be configured rotate to increase θA and the second propeller blade 328A may be configured to rotate to increase θB in response to incident wind 170 on the first propeller unit 320A in the fourth direction. With this arrangement, the rotation of the first propeller blade 326A to increase θA and the rotation of the second propeller blade 328A to increase θB may be referred to as passive.

For instance, in some embodiments, the incident wind on the propeller unit 320A in the fourth direction may contact the surface area 334A of the first propeller blade 326A so as to cause at least in part the first propeller blade 326A to rotate around the first hub axis 376A so as to increase θA. Moreover, in some embodiments, the incident wind on the propeller unit 320A in the fourth direction may contact the surface area of the second propeller blade 328A perpendicular to the axis of rotation 330A and the second hub axis 378A so as to cause at least in part the second propeller blade 328A to rotate around the second hub axis 378A so as to increase θB.

Returning to FIGS. 3a and 3b, the second propeller unit 320B may take the form of or be similar in form to the first propeller unit 320A. For example, the second propulsion unit 320B includes a shaft 322B coupled to a motor 324B, and a first propeller blade 326B and a second propeller blade 328B that are both connected to the shaft 322B.

In the illustrated example, the motor 324B is connected to the second wing 314. The motor 324B may be connected to the second wing 314 in the same or similar way as the motor 324A is connected to the first wing 312. In addition, the motor 324B may be connected to other portions of the aerial vehicle 300 in the same or similar way as the motor 324A may be connected to other portions of the aerial vehicle 300. Moreover, the motor 324B may be powered by a fuel or one or more batteries in the same or similar way as the motor 324A is powered.

As shown in FIG. 3a, the second propeller blade 328B may be substantially opposite the first propeller blade 326B in the same or similar way as the second propeller blade 328A may be substantially opposite the first propeller blade 326A. When the motor 324B is turned on, the motor 324B may drive the shaft 322B so as to rotate the first propeller blade 326B and the second propeller blade 328B around an axis of rotation 330B. With this arrangement, when the motor 324B is turned on, the first propeller blade 326B and the second propeller blade 328B may provide substantially the same thrust along the axis of rotation 330B in the same or similar way as the first propeller blade 326A and the second propeller blade 328A may provide substantially the same thrust along the axis of rotation 330A. The thrust provided by the first propeller blade 326B and the second propeller blade 328B may contribute to a lift of the aerial vehicle 100 for takeoff and hover flight.

As shown in FIG. 3b, when the aerial vehicle 100 is in forward flight in the first direction 350 and the motor 324B is turned off, the first propeller blade 326B may be configured to orient in a second direction 352B1 that is substantially parallel to the first direction 350 and the second propeller blade 328B may be configured to orient in a third direction 352B2 that is substantially parallel to the first direction 350. The first propeller blade 326B may be configured to orient in the second direction 352B1 in the same or similar way the first propeller blade 326A may orient in the second direction 352A1, and the second propeller blade 328B may be configured to orient in the third direction 352B2 in the same or similar way the second propeller blade 328A may orient in the third direction 352A2.

In addition, in some embodiments, when the aerial vehicle 300 is in forward flight in the first direction 350 and the motor 324B is turned off, the hub 370B may be configured to orient in a direction that is substantially parallel to the first direction 350, such that the first end 372B of the hub 370B is substantially upwind of the second end 374B of the hub 370B in the same or similar way that the hub 370A is configured to orient in a direction that is substantially parallel to the first direction 350. Accordingly, in such embodiments, the first propeller blade 326B may be configured to orient in the second direction 352B1 and the second propeller blade 328B may be configured to orient in the third direction 352B2, such that the first propeller blade 326B and the second propeller blade 328B are each oriented substantially downwind of the first end 372B of the hub 370B in the same or similar way as the first propeller blade 326A may be configured to orient in the second direction 352A1 and the second propeller blade 328A may be configured to orient in the third direction 352A2, such that the first propeller blade 326A and the second propeller blade 328A are each oriented substantially downwind of the first end 372A of the hub 370A.

Moreover, in some embodiments, when the aerial vehicle 300 is in forward flight in the first direction 350 and the motor 324B is turned off, the shaft 322B and/or the motor 324B may be configured to orient in a direction that is substantially parallel to the first direction 350 in the same or similar way as the shaft 322A and/or the motor 324A are configured to orient in the direction that is substantially parallel to the first direction 350.

Further, in some embodiments, when the aerial vehicle 300 is in forward flight in the first direction 350 and the motor 324B is turned off, the first propeller blade 326B may be configured to rotate to increase a first angle (not shown) between an axis (not shown) defined by the first direction 350 in the same or similar way as the first propeller blade 326A may be configured to rotate to increase θA between the first propeller 326A and the axis 380, and the second propeller blade 328B may be configured to rotate to increase a second angle (not shown) between an axis (not shown) defined by the first direction 350 in the same or similar way as the second propeller blade 328A may be configured to rotate to increase θB between the second propeller 328A and the axis 380.

The body 302, the first wing 312, the second wing 314, the one or more propeller units 320, and the one or more propulsion units 340 may include any suitable material which allows the aerial vehicle 300 to engage in hover flight and forward flight. For example, the first propeller blade 326A, the second propeller blade 328A, the first propeller blade 326B, and the second propeller blade 328B may include any of the materials that the first propeller blade 126A, the second propeller blade 128A, the first propeller blade 126B, the second propeller blade 128B, the propeller blade 226A, and/or the propeller blade 226B may include. In addition, the hub 370A and/or the hub 370B may include a variety of materials, such as one or more metals (e.g., steel), foam, plastic, carbon fiber, composites, e-glass, etc.

The aerial vehicle 300 may also include in control system 360. The control system 360 is configured to control operation(s) of the aerial vehicle 300 and its components. In some embodiments, the control system 360 may be configured to perform one or more functions described herein.

For example, in some embodiments, the first propeller blade 326A may be configured to orient in the second direction 352A1 in response to the control system 360 positioning the first propeller blade 326A in the second direction 352A1. Similarly, the second propeller blade 328A may be configured to orient in the third direction 352A2 in response to the control system 360 positioning the second propeller blade 328A in the third direction 352A2. Moreover, in some embodiments, the first propeller blade 326B may be configured to orient in the second direction 352B1 in response to the control system 360 positioning the first propeller blade 326B in the second direction 352B1. Similarly, the second propeller blade 328B may be configured to orient in the third direction 352B2 in response to the control system 360 positioning the second propeller blade 328B in the third direction 352B2. With this arrangement, the positioning to the first propeller blade 326A, the second propeller blade 326B, the first propeller blade 326B, and/or the second propeller blade 328B may be referred to as active.

Moreover, in some embodiments, the hub 370A may be configured to orient in the direction that is substantially parallel to the first direction 350 in response to the control system 360 positioning the hub 370A in the direction. Similarly, the hub 370B may be configured to orient in the direction that is substantially parallel to the first direction in response to the control system 360 positioning the hub 370B in the direction.

Further, in some embodiments, the shaft 322A and/or the motor 324A may be configured to orient in the direction that is substantially parallel to the first direction 350 in response to the control system 360 positioning the shaft 322A and/or the motor 324B in the direction. Similarly, in some embodiments, the shaft 322B and/or the motor 324B may be configured to orient in the direction that is substantially parallel to the first direction 350 in response to the control system 360 positioning the shaft 322B and/or the motor 324B in the direction. The control system 360 may take the form of or be similar in form to the control system 160 and/or the control system 260.

Further still, in some embodiments, the first propeller blade 326A may rotate to increase θA in response to the control system 360 positioning the first propeller blade 326A so as to increase θA. Similarly, the second propeller blade 326B may rotate to increase θB in response to the control system positioning the second propeller blade 328A so as to increase θB. Moreover, in some embodiments, the first propeller blade 326B may rotate to increase the angle between the first propeller blade 326B and the axis defined by the first direction 350 in response to the control system 360 positioning the first propeller blade 326B so as to increase the angle. Similarly, the second propeller blade 328B may rotate to increase the angle between the second propeller blade 328B and the axis defined by the first direction 350 in response to the control system 360 positioning the second propeller blade 328B so as to increase the angle. With this arrangement, the rotation of the first propeller blade 326A, the second propeller blade 328A, the first propeller blade 326B, and/or the second propeller blade 328B may be referred to as active.

In some embodiments, the orientation of the first propeller blade 326A in the second direction 352A1 and the orientation of the second propeller blade 328A in the third direction 352A2 may reduce drag on the first propeller unit 320A and/or reduce turbulence near the first propeller unit 320A. Moreover, in at least one such embodiment, the orientation of the first propeller blade 326A in the second direction 352A1 and the second propeller blade 328A in the third direction 352A2 may reduce drag on the aerial vehicle 300, reduce instability of the aerial vehicle 300, reduce oscillation of the aerial vehicle 300, and/or reduce disruption of air flow over the aerial vehicle 300.

Moreover, in some embodiments, the orientation of the first propeller blade 326B in the second direction 352B1 and the second propeller blade 328B in the third direction 352B2 may reduce drag on the second propeller unit 320B and/or reduce turbulence near the second propeller unit 320B. Moreover, in at least one such embodiment, the orientation of the first propeller blade 326B in the second direction 352A1 and the second propeller blade 328B in the third direction 352B2 may reduce drag on the aerial vehicle 300, reduce instability of the aerial vehicle 300, reduce oscillation of the aerial vehicle 300, and/or reduce disruption of air flow over the aerial vehicle 300.

Further, in some embodiments, the rotation the first propeller blade 326A to increase θA and the rotation the second propeller blade 328A to increase θB may reduce drag on the first propeller unit 320A and/or reduce turbulence near the first propeller unit 320A. Moreover, in at least one such embodiment, the rotation the first propeller blade 326A to increase θA and the rotation the second propeller blade 328A to increase θB may reduce drag on the aerial vehicle 300, reduce instability of the aerial vehicle 300, reduce oscillation of the aerial vehicle 300, and/or reduce disruption of air flow over the aerial vehicle 300.

Further still, in some embodiments, the rotation the first propeller blade 326B to increase the angle between the first propeller blade 326B and the axis defined by the first direction 350 and the rotation the second propeller blade 328B to increase the angle between the second propeller blade 328B and the axis defined by the first direction 350 may reduce drag on the second propeller unit 320B and/or reduce turbulence near the second propeller unit 320B. Moreover, in at least one such embodiment, the rotation the first propeller blade 326B to increase the angle between the first propeller blade 326B and the axis defined by the first direction 350 and the rotation the second propeller blade 328B to increase the angle between the second propeller blade 328B and the axis defined by the first direction 350 may reduce drag on the aerial vehicle 300, reduce instability of the aerial vehicle 300, reduce oscillation of the aerial vehicle 300, and/or reduce disruption of air flow over the aerial vehicle 300.

Further, in some embodiments, the body 302 of the aerial vehicle 300 may be in a first orientation during takeoff and hover flight, and the body 302 of the aerial vehicle 300 may be in a second orientation that is substantially the same as the first orientation during forward flight. And in at least one such embodiment, the first orientation may be substantially parallel to the ground.

Further still, in some embodiments, the aerial vehicle 300 may be a UAV. Moreover, in some embodiments, the aerial vehicle 300 may be operated by a pilot, such as a physically-present human pilot. And in at least one such embodiment, the aerial vehicle 300 could transport one or more passengers.

While the aerial vehicles 100, 200, and 300 have been described above, it should be understood that the propeller units described herein could be implemented in any suitable aerial vehicle.

For instance, in some embodiments, an aerial vehicle may include one or more propeller units that include the first propeller unit 120A and the second propeller unit 220B and/or the second propeller unit 320B; the first propeller unit 220A and/or the second propeller unit 120B or the second propeller unit 320B; and the first propeller unit 320A and the second propeller unit 120B and/or the second propeller unit 220B. Moreover, in some embodiments, an aerial vehicle may include one or more propeller units that include the first propeller unit 120A, the second propeller unit 120B, the first propeller unit 220A, the second propeller unit 220B, the third propeller unit 320A, and/or the fourth propeller unit 320B.

B. Take Off and Flight

Figure 4:
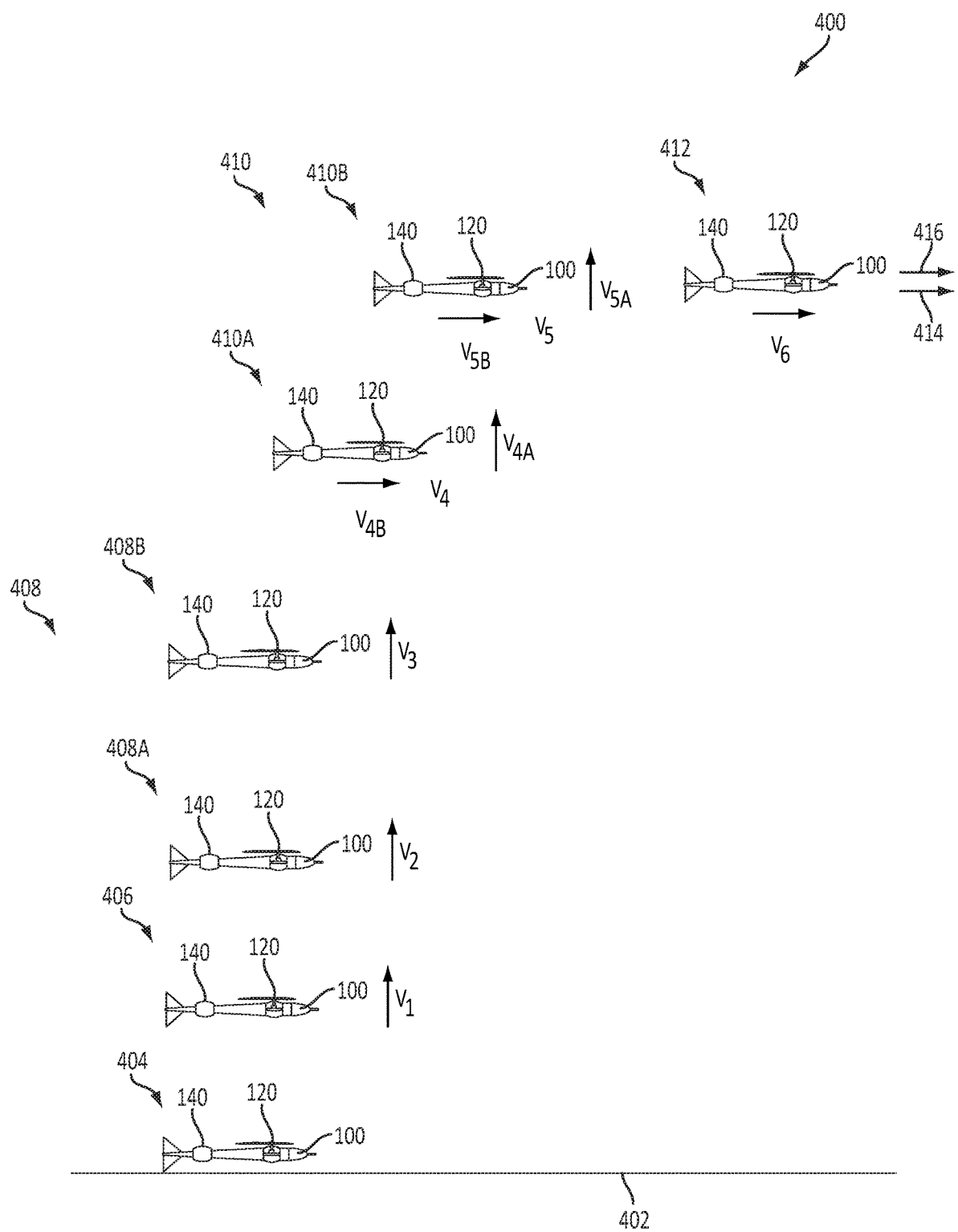
FIG. 4 is an example of an aerial vehicle taking off and entering flight, according to an example embodiment.

FIG. 4 depicts an example 400 of an aerial vehicle taking off and entering flight according to an example embodiment. Example 400 is generally described by way of example as being carried out by the aerial vehicle 100 described above in connection with FIG. 1. For illustrative purposes, example 400 is described in reference to an aerial vehicle carrying out the series of actions shown in FIG. 4 at locations along a path of travel. It should be understood, however, that example 400 could be carried out via other actions and/or combinations of actions.

Example 400 begins at location 404 with the aerial vehicle 100 being located on a ground 402. The aerial vehicle 100 may be configured to takeoff from a ground 402 that varies in form. For example, the aerial vehicle 100 may be configured to takeoff from terrain that is substantially flat. However, the aerial vehicle 100 may additionally or alternatively be configured to takeoff from terrain that is sloped, hilly, and/or mountainous, among other possibilities. Further, the aerial vehicle 100 may be configured to takeoff and/or land in various types of environments, such as an urban or rural environment.

Example 400 continues at location 406 with operating the one or more propeller units 120, such that the aerial vehicle 100 takes off and enters hover flight. In some embodiments, at location 406 the one or more propeller units 120 may provide thrust for takeoff and hover flight of the aerial vehicle 100.

In the illustrated example, at location 406 the takeoff of the aerial vehicle 100 may be substantially vertical. Accordingly, in the illustrated example, at location 406 the aerial vehicle 100 may lift off the ground 402 with a velocity V1 that is substantially perpendicular to the ground 402. In some embodiments, the takeoff may be vertical or a deviation from vertical that does not cause the aerial vehicle 100 to operate in a significantly different manner from when the takeoff is vertical. Moreover, in some embodiments, V1 may be perpendicular to the ground 402 or a deviation from perpendicular that does not cause the aerial vehicle 100 to operate in a significantly different manner from when V1 is perpendicular to the ground 402.

However, in some embodiments, at location 406, the aerial vehicle 100 may lift off the ground 402 in a direction that has a first component that is perpendicular to the ground 402 and a second component that is parallel to the ground 402. Accordingly, in some embodiments, V1 may have a first component that is perpendicular to the ground 402 and a second component that is parallel to the ground 402. And in at least one such embodiment, a magnitude (e.g., speed) of the first component V1 may be greater than a magnitude of the second component of V1.

In some embodiments, operating the one or more propeller units 120 may involve turning on the motor 122A and the motor 122B (as shown in FIG. 1). Moreover, in some embodiments, the one or more propeller units 120 may be operated by the control system 160.

Example 400 continues at one or more locations 408 with the aerial vehicle 100 ascending in hover flight. In some embodiments, at the one or more locations 408 the one or more propeller units 120 may provide thrust for the aerial vehicle 100 to ascend in hover flight.

In this example, the one or more locations 408 is shown as two locations, a location 408A and a location 408B. However, in other examples, the one or more locations 408 may include less than two or more than two locations.

As shown in FIG. 4, at location 408A the aerial vehicle 100 may ascend with a velocity V2, and at location 408B the aerial vehicle 100 may ascend with a velocity V3. In some embodiments, a magnitude of V3 may be greater than a magnitude of V2.

In the illustrated example, at location 408A the aerial vehicle 100 may ascend substantially vertically. Accordingly, in the illustrated example, V2 may be substantially perpendicular to the ground 402. In some embodiments, the aerial vehicle 100 may ascend vertically or a deviation from vertically that does not cause the aerial vehicle 100 to operate in a significantly different manner from when the aerial vehicle 100 ascends vertically. Moreover, in some embodiments, V2 may be perpendicular to the ground 402 or a deviation from perpendicular that does not cause the aerial vehicle 100 to operate in a significantly different manner from when V2 is perpendicular to the ground 402.

However, in some embodiments, at location 408A the aerial vehicle 100 may ascend in a direction that has a first component that is perpendicular to the ground 402 and a second component that is parallel to the ground 402. Accordingly, in some embodiments, V2 may have a first component that is perpendicular to the ground 402 and a second component that is parallel to the ground 402. And in at least one such embodiment, a magnitude of the first component of V2 may be greater than a magnitude of the second component of V2.

Similarly, in the illustrated example, at location 408B the aerial vehicle 100 may ascend substantially vertically. Accordingly, in the illustrated example, V3 may be substantially perpendicular to the ground 402 in the same or similar way as V2 may be substantially perpendicular to the ground 402. However, in some embodiments, at location 408B the aerial vehicle 100 may ascend in a direction that has a first component that is perpendicular to the ground and a second component that is parallel to the ground. Accordingly, in some embodiments, V3 may have a first component that is perpendicular to the ground and a second component that is parallel to the ground. And in at least one such embodiment, a magnitude of the first component of V3 may be greater than a magnitude of the second component of V3.

Example 400 continues at one or more locations 410 with operating the one or more propulsion units 140 and the one or more propeller units 120, such that the aerial vehicle transitions from hover flight to forward flight. In some embodiments, at the one or more locations 410 the one or more propeller units 120 and the one or more propulsion units 140 may provide thrust for the aerial vehicle 100 to transition from hover flight to forward flight. Moreover, in some embodiments, the one or more propulsion units 140 may be operated by the control system 160.

In this example, the one or more locations 410 is shown as two locations, a location 410A and a location 410B. However, in other examples, the one or more locations 408 may include less than two or more than two locations.

As shown in FIG. 4, at location 410A the aerial vehicle 100 may ascend with a velocity V4, and at location 410B the aerial vehicle 100 may ascend with a velocity V5.

In the illustrated example, at location 410A the aerial vehicle 100 may ascend in a direction that has a first component that is perpendicular to the ground 402 and a second component that is parallel to the ground 402. Accordingly, in the illustrated example, V4 may have a first component V4A that is perpendicular to the ground 402 and a second component V4B that is parallel to the ground 402. In some embodiments, V4A may have a magnitude that is greater than a magnitude of V4B. However, in other embodiments, V4B may have a magnitude that is greater than a magnitude of V4A.

Similarly, in the illustrated example, at location 410B the aerial vehicle 100 may ascend in a direction that has a first component that is perpendicular to the ground 402 and a second component that is parallel to the ground 402. Accordingly, in the illustrated example, V5 may have a first component V5A that is perpendicular to the ground 402 and a second component V5B that is parallel to the ground 402. In some embodiments, V5B may have a magnitude that is greater than a magnitude of V5A. However, in other embodiments, V5B may have a magnitude that is less than a magnitude of V5A.

In some embodiments, the one or more propeller units 120 may be throttled down during the transition from hover flight to forward flight (e.g., thrust provided by the one or more propeller units 120 may be decreased). With this arrangement, a velocity of the aerial vehicle 100 that is substantially perpendicular to the ground 402 may decrease during the transition from hover flight to forward flight.

For instance, in some embodiments, thrust provided by the one or more propeller units 120 at location 410B may be less than thrust provided by the one or more propeller units 120 at location 410A. Accordingly, in some embodiments, a magnitude of V5A at location 410B may be less than a magnitude of V4A at location 410A. Moreover, in some embodiments, the one or more propeller units 120 may be throttled down by the control system 160.

Further, the one or more propeller units 120 may be throttled down by decelerating one or more motors. For instance, in some embodiments, the first propeller unit 120A may be throttled down by decelerating motor 124A. Further still, in some embodiments, the second propeller unit 120B may be throttled down by decelerating motor 124B.

In some embodiments, the one or more propulsion units 140 may be throttled up during the transition from hover flight to forward flight (e.g., thrust provided by the one or more propulsion units 140 may be increased). With this arrangement, a velocity of the aerial vehicle 100 that is substantially parallel to the ground 402 may increase during the transition from hover flight to forward flight. In some embodiments, the velocity may be parallel to the ground 402 or a deviation from parallel that does not cause the aerial vehicle 100 to operate in a significantly different manner from when the velocity is parallel to the ground 402.

For instance, in some embodiments, thrust provided by the one or more propulsion units 140 at location 410B may be greater than thrust provided by the one or more propulsion units 140 at location 410A. Accordingly, in some embodiments, a magnitude of V5B at location 410B may be greater than a magnitude of V4B at location 410A. Moreover, in some embodiments, the one or more propulsion units 120 may be throttled up by the control system 160.

Moreover, in some embodiments, the one or more propulsion units 140 may be throttled up by turning on some or all of the one or more propulsion units 140 during different time periods. For instance, in some embodiments, the first propulsion unit 140A may be turned on during a first time period and the second propulsion unit 140B may be turned on during a second time period.

Example 400 continues at location 412 with while the aerial vehicle 100 is in forward flight in a first direction 414, turning off the one or more propeller units 120, such that the one or more propeller units 120 orient in one or more respective second directions 416 that are each substantially parallel to the first direction 414. In some embodiments, at location 412 the one or more propulsion units 140 may provide thrust for the aerial vehicle 100 for forward flight.

As shown in FIG. 4, at location 412 the aerial vehicle 100 may translate over the ground 402 with a velocity of V6. In the illustrated example, the first direction 414 may be substantially parallel to the ground 402. Accordingly, with this arrangement, V6 may be substantially parallel to the ground 402. In some embodiments, the first direction 414 may be parallel to the ground 402 or a deviation from parallel that does not cause the aerial vehicle 100 to operate in a significantly different manner from when the first direction 414 is parallel to the ground 402. Moreover, in some embodiments, V6 may be parallel to the ground 402 or a deviation from parallel that does not cause the aerial vehicle 100 to operate in a significantly different manner from when V6 is parallel to the ground 402.

However, in other examples, the first direction 414 may have a first component that is perpendicular to the ground 502 and a second component that is parallel to the ground 502. Accordingly, with this arrangement, V6 may have a first component that is perpendicular to the ground 502 and a second component that is parallel to the ground 502. In some embodiments, a magnitude of the first component of V6 may be greater than a magnitude of the second component of V6.

The one or more propeller units 120 may orient in one or more respective second directions 416 at location 412 in the same or similar way as described with reference to FIGS. 1a-c. For instance, in some embodiments, the first propeller unit 120A may orient in a first respective second direction that may take the form of or be similar in form to the second direction 152A. Moreover, in some embodiments, the second propeller unit 120B may orient in a second respective direction that may take the form of or be similar in form to the second direction 152B.

Further, in some embodiments, the first propeller unit 120A may orient in the first respective second direction in response to incident wind and/or in response to the control system 160 as described with reference to FIGS. 1a-c. Further still, in some embodiments, the second propeller unit 120B may orient in the second respective direction in response to incident wind and/or in response to the control system as described with reference to FIGS. 1a-c.

In some embodiments, turning off the one or more propeller units 120 may involve the control system 160 turning off the one or more propeller units. Moreover, in some embodiments, turning off the one or more propeller units 120 may involve turning off the one or more propeller units 120 when the aerial vehicle has a certain speed.

In some implementations, some or all of the one or more propeller units 120 may be turned off during the same or similar time period, such that the one or more propeller units 120 may orient in one or more respective second directions during the same or similar time period. For instance, in some embodiments, turning off the one or more propeller units 120 may involve turning off the first propeller unit 120A at a first time, such that the first propeller unit 120A orients in the first respective second direction during a second time period; and turning off the second propeller unit 120A at the first time, such that the second propeller unit 120B orients in the second respective second direction during the second time period.

However, in other implementations, the one or more propeller units 120 may be turned off at different time periods, such that the one or more propeller units 120 may orient in one or more respective second directions during different time periods. For instance, in some embodiments, turning off the one or more propeller units 120 may involve turning off the first propeller unit 120A at a first time, such that the first propeller unit 120A orients in the first respective second direction during a second time period; and turning off the second propeller unit 120A at a third time period, such that the second propeller unit 120B orients in the second respective second direction during the fourth time period. And in at least some embodiments, the third time period may be the second time period.

As shown in FIG. 4, at locations 406-412 the aerial vehicle 100 may have substantially the same orientation. In the illustrated example, at locations 406-412 the aerial vehicle 100 may be oriented substantially parallel to the ground 402. In some embodiments, the orientation may be the same or a deviation from the same that does not cause the aerial vehicle 100 to operate in a significantly different manner from when the orientation is the same. Moreover, in some embodiments, the aerial vehicle 100 may be oriented parallel to the ground 402 or a deviation from parallel that does not cause the aerial vehicle 100 to operate in a significantly different manner from when the orientation is parallel to the ground 402.

Although the example 400 has been described as being carried out by the aerial vehicle 100, other aerial vehicles may carry out example 400 as well. For instance, the aerial vehicle 200 and the aerial vehicle 300 may each carry out example 400.

For example, when the aerial vehicle 200 carries out example 400, at location 412 the one or more propeller units 220 may orient in one or more respective second directions 414 in the same or similar way as described with reference to FIGS. 2a-c. For instance, in some embodiments, the first propeller unit 220A may orient in a first respective direction that may take the form of or be similar in form to the second direction 252A. Further, in some embodiments, the second propeller unit 220B may orient in a second respective direction that may take the form of or be similar in form to the second direction 252B.

As another example, when the aerial vehicle 300 carries out example 400, at location 412 the one or more propeller units 320 may orient in one or more respective second directions 416 in the same or similar way as described with reference to FIGS. 3a-d. For instance, in some embodiments, the first propeller blade 326A may orient in a first respective second direction that may take the form of or be similar in form to the second direction 352A1. Moreover, in some embodiments, the second propeller blade 328A may orient in a second respective second direction that may take the form of or be similar in form to the third direction 352A2. Similarly, in some embodiments, the first propeller blade 326B may orient in a first respective second direction that may take the form of or be similar in form to the second direction 352B1. Moreover, in some embodiments, the second propeller blade 328A may orient in a second respective second direction that may take the form of or be similar in form to the third direction 352B2.

As yet another example, when the aerial vehicle 300 carries out example 400, at location 412 the one or more propeller blades of the one or more propeller units 320 may rotate to increase respective angles between respective propeller blades and an axis defined by the first direction 414 in the same or similar way as described with reference to FIGS. 3a-f. For instance, in some embodiments, the first propeller blade 326A may rotate to increase a respective angle between the first propeller blade 326A and the axis defined by the first direction 414 that may take the form of or be similar in form to θA between the first propeller blade 326A and the axis 380. Moreover, in some embodiments, the second propeller blade 328A may rotate to increase a respective angle between the second propeller blade 328A and the axis defined by the first direction 414 that may take the form of or be similar in form to θB between the second propeller blade and the axis 380.

Further, numerous variations to example 400 are possible as well. For instance, although the aerial vehicle 100 has been described as ascending at location 410A and location 410B above, in other examples the aerial vehicle 100 may descend at location 410A and/or location 410B.

Figure 5:
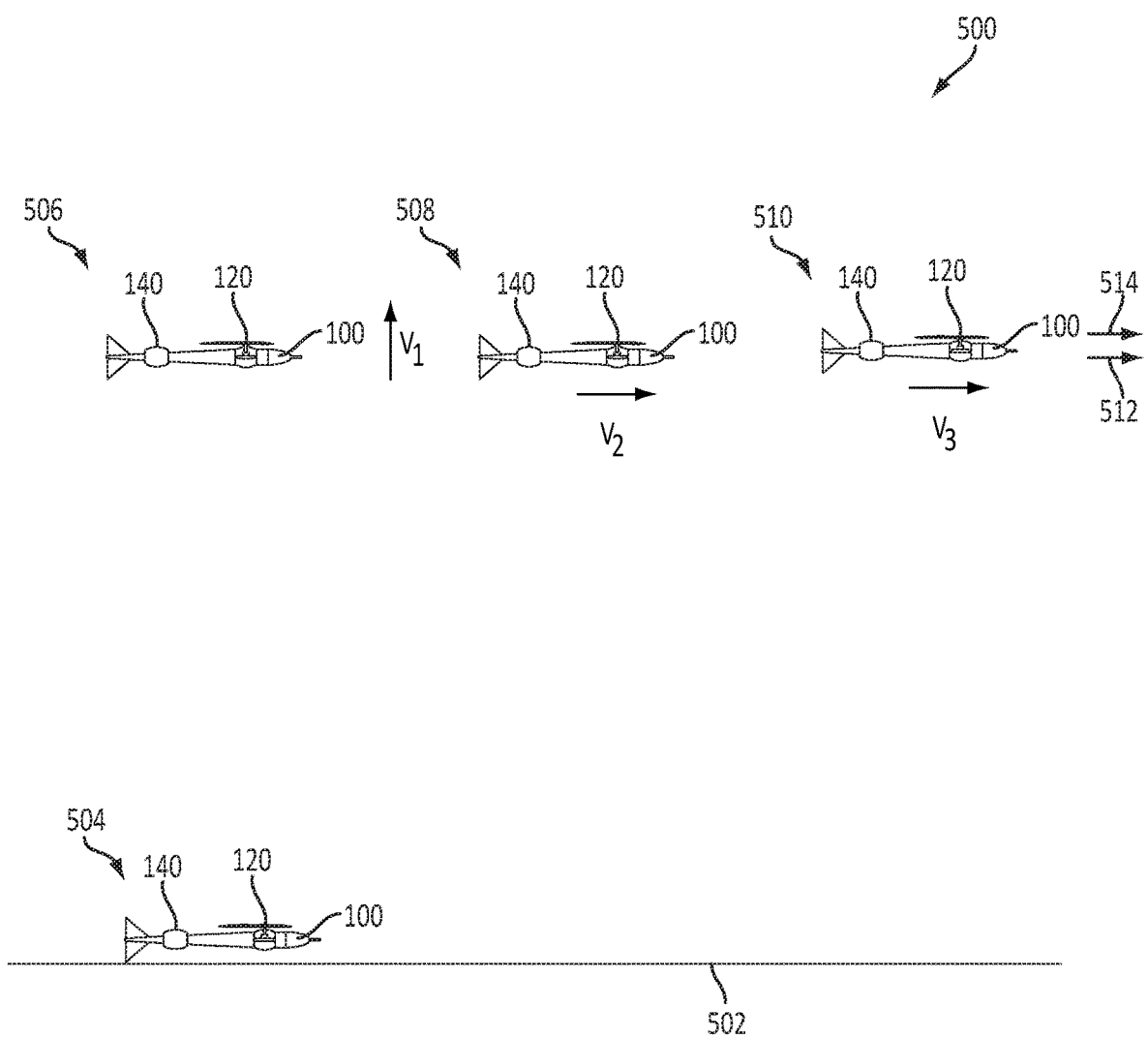
FIG. 5 is another example of an aerial vehicle taking off and entering flight, according to an example embodiment.

Other examples of takeoff and/or flight are possible as well. For instance, FIG. 5 depicts an example 500 of an aerial vehicle taking off and entering flight, according to an example embodiment. Example 500 is generally described by way of example as being carried out by the aerial vehicle 100 described above in connection with FIG. 1. For illustrative purposes, example 500 is described in reference to an aerial vehicle carrying out the series of actions shown in FIG. 5 at locations along a path of travel. It should be understood, however, that example 500 could be carried out via other actions and/or other combination of actions.

Example 500 begins at location 504 with the aerial vehicle 100 being located on a ground 502. The aerial vehicle 100 may be configured to takeoff from a ground 502 that varies in form. The ground 502 may take the form of or be similar in form to the ground 402.

Example 500 continues at location 506 with operating the one or more propeller units 120, such that the aerial vehicle 100 takes off and enters hover flight. In some embodiments, at location 506 the one or more propeller units may provide thrust for takeoff and hover flight of the aerial vehicle 100.

In the illustrated example, at location 506 the takeoff and hover flight of the aerial vehicle 100 may be substantially vertical. Accordingly, in the illustrated example, at location 506 the aerial vehicle 100 may lift off the ground 502 and enter hover flight with a velocity V1 that is substantially perpendicular to the ground 502. In some embodiments, the takeoff may be vertical or a deviation from vertical that does not cause the aerial vehicle 100 to operate in a significantly different manner from when the takeoff is vertical. Moreover, in some embodiments, V1 may be perpendicular to the ground 502 or a deviation from perpendicular that does not cause the aerial vehicle 100 to operate in a significantly different manner from when V1 is perpendicular to the ground 502.

However, in some embodiments, at location 506, the aerial vehicle may lift off the ground 502 and enter hover flight in a direction that has a first component that is perpendicular to the ground 502 and a second component that is parallel to the ground 502. Accordingly, in some embodiments, V1 may have a first component that is perpendicular to the ground 502 and a second component that is parallel to the ground 502. And in at least one such embodiment, a magnitude of the first component V1 may be greater than a magnitude of the second component of V1.

Example 500 continues at location 508 with operating the one or more propulsion units 140, such that the aerial vehicle 100 enters forward flight. As shown in FIG. 5, at location 508 the aerial vehicle 100 may translate over the ground 502 with a velocity of V2. In the illustrated example, V2 may be substantially parallel to the ground 502. However, in other examples, V2 may have a first component that is perpendicular to the ground 502 and a second component that is parallel to the ground 502. In some embodiments, a magnitude of the second component of V2 may be greater than a magnitude of the first component of V2.

Example 500 continues at location 510 with while the aerial vehicle 100 is in forward flight in a first direction 512, turning off the one or more propeller units 120, such that the one or more propeller units 120 orient in one or more respective second directions 512 that are each substantially parallel to the first direction 512. The one or more propeller units 120 may orient in one or more respective second directions 514 at location 510 in the same or similar way as the one or more propeller units may orient at location 412.

As shown in FIG. 5, at location 510 the aerial vehicle 100 may translate over the ground 502 with a velocity of V3. In the illustrated example, the first direction 514 may be substantially parallel to the ground 502. Accordingly, with this arrangement, V3 may be substantially parallel to the ground 502. However, in other examples, the first direction 512 may have a first component that is perpendicular to the ground 502 and a second component that is parallel to the ground 502. Accordingly, with this arrangement, V3 may have a first component that is perpendicular to the ground 502 and a second component that is parallel to the ground 502. In some embodiments, a magnitude of the second component of V3 may be greater than a magnitude of the first component of V3.

At locations 506-510 the aerial vehicle 100 may have the substantially same orientation. In the illustrated example, at locations 506-510 the aerial vehicle 100 may be oriented substantially parallel to the ground 502. In some embodiments, the orientation may be the same or a deviation from the same that does not cause the aerial vehicle 100 to operate in a significantly different manner from when the orientation is the same. Moreover, in some embodiments, the aerial vehicle 100 may be oriented parallel to the ground 502 or a deviation from parallel that does not cause the aerial vehicle 100 to operate in a significantly different manner from when the orientation is parallel to the ground 502.

Although example 500 has been described as being carried out by the aerial vehicle 100, other aerial vehicles may carry out example 500 as well. For instance, the aerial vehicle 200 and the aerial vehicle 300 may each carry out example 500.

For example, when the aerial vehicle 300 carries out example 500, at location 510 the one or more propeller blades of the one or more propeller units 320 may rotate to increase respective angles between respective propeller blades and an axis defined by the first direction 512 in the same or similar way as the one or more propeller blades may rotate at location 412.

C. Land

Figure 6:
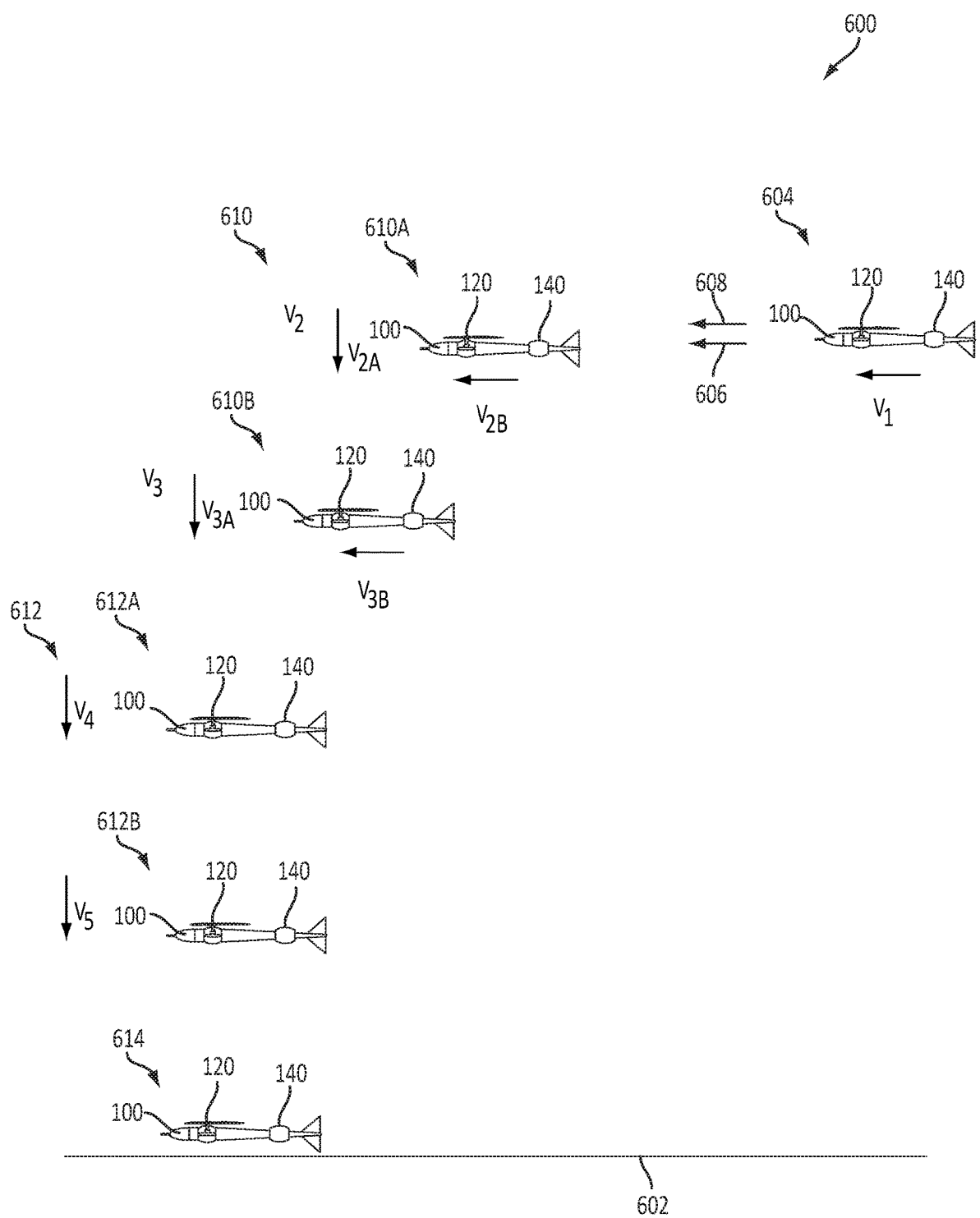
FIG. 6 is an example of an aerial vehicle landing, according to an example embodiment.

FIG. 6 depicts an example 600 of an aerial vehicle landing, according to an example embodiment. Example 600 is generally described by way of example as being carried out by the aerial vehicle 100 described above in connection with FIG. 1. For illustrative purposes, example 600 is described in reference to an aerial vehicle carrying out the series actions as shown in FIG. 6 at locations along a path of travel. It should be understood, however, that example 600 could be carried out via any other actions and/or combination of actions.

Example 600 begins at location 604 with operating the one or more propulsion units 140, such that the aerial vehicle enters forward flight in a first direction 606. As shown in FIG. 6, the aerial vehicle 100 is flying over ground 602. The ground 602 may take the form of or be similar in form to the ground 402 and/or the ground 502. In some embodiments, at location 604 the one or more propulsion units 140 may provide thrust for the aerial vehicle 100 for forward flight. Moreover, in some embodiments, the one or more propulsion units 140 may be operated by the control system 160.

At location 604, the one or more propulsion units 120 may be turned off and the one or more propeller units 120 may each be oriented in one or more respective second directions 608 that are each substantially parallel to the first direction 604. In some embodiments, the one or more respective second directions 608 may be parallel to the first direction 606 or a deviation from parallel that does not cause the aerial vehicle 100 to operate in a significantly different manner when the one or more respective second directions 608 are parallel to the first direction 606. The one or more propeller units 120 may be oriented in one or more respective second directions at location 604 in the same or similar way as the one or more propeller units 120 may be oriented in one or more respective second directions at location 412.

As shown in FIG. 6, the aerial vehicle 100 may translate over ground 602 with a velocity V1. In the illustrated example, the first direction 606 may be substantially parallel to the ground 602. Accordingly, with this arrangement, V1 may be substantially parallel to the ground 602. In some embodiments, the first direction 606 may be parallel to the ground 602 or a deviation from parallel that does not cause the aerial vehicle 100 to operate in a significantly different manner from when the first direction 606 is parallel to the ground 602. Moreover, in some embodiments, V1 may be parallel to the ground 602 or a deviation from parallel that does not cause the aerial vehicle 100 to operate in a significantly different manner from when V1 is parallel to the ground 602.

However, in other examples, the first direction 606 may have a first component that is perpendicular to the ground 602 and a second component that is parallel to the ground 602. Accordingly, with this arrangement, V1 may have a first component that is perpendicular to the ground and a second component that is parallel to the ground. In some embodiments, a magnitude of the second component of V1 may be greater than a magnitude of the first component of V1.

Example 600 continues at one or more locations 610 with operating the one or more propeller units 120 and the one or more propulsion units 140, such that the aerial vehicle 100 may transition from forward flight to hover flight. In some embodiments, at the one or more locations 610 the one or more propeller units 120 and the one or more propulsion units 140 may provide thrust for the aerial vehicle 100 to transition from forward flight to hover flight. Moreover, in some embodiments, the one or more propulsion units 140 may be operated by the control system 160.

In this example, the one or more locations 610 is shown as two locations, a location 610A and a location 610B. However, in other examples, the one or more locations 610 may include less than two or more than two locations.

As shown in FIG. 6, at location 610A the aerial vehicle 100 may descend with a velocity V2, and at location 610B the aerial vehicle 100 may descend with a velocity V3.

In the illustrated example, at location 610A the aerial vehicle 100 may descend in a direction that has a first component that is perpendicular to the ground 602 and a second component that is parallel to the ground 602. Accordingly, in the illustrated example, V2 may have a first component V2A that is perpendicular to the ground 602 and a second component V2B that is parallel to the ground 602. In some embodiments, V2A may have a magnitude that is greater than a magnitude of V2B. However, in other embodiments, V2B may have a magnitude that is greater than a magnitude of V2A.

Similarly, in the illustrated example, at location 610B the aerial vehicle 100 may descend in a direction that has a first component that is perpendicular to the ground 602 and a second component that is parallel to the ground 602. Accordingly, in the illustrated example, V3 may have a first component V3A that is perpendicular to the ground 602 and a second component V3B that is parallel to the ground 602. In some embodiments, V3B may have a magnitude that is greater than a magnitude of V3A. However, in other embodiments, V3B may have a magnitude that is less than a magnitude of V3A.

In some embodiments, the one or more propulsion units 140 may be throttled down during the transition from forward flight to hover flight (e.g., thrust provided by the one or more propulsion units 140 may be decreased). With this arrangement, a velocity of the aerial vehicle 100 that is substantially parallel to the ground 602 may decrease during the transition from forward flight to hover flight.

For instance, in some embodiments, thrust provided by the one or more propulsion units 140 at location 610B may be less than thrust provided by the one or more propulsion units 140 at location 610A. Accordingly, in some embodiments, a magnitude of V3B at location 608B may be less than a magnitude of V2B at location 610A. Moreover, in some embodiments, the one or more propulsion units 140 may be throttled down by the control system 160.

In some embodiments, the one or more propeller units 120 may be throttled up during the transition from hover flight to forward flight (e.g., thrust provided by the one or more propeller units 120 may be increased). With this arrangement, a velocity of the aerial vehicle 100 that is substantially perpendicular to the ground 602 may increase during the transition from forward flight to hover flight. In some embodiments, the velocity may be perpendicular to the ground 602 or a deviation from perpendicular to the ground 602 that does not cause the aerial vehicle 100 to operate in a significantly different manner from when the velocity is perpendicular to the ground 602.

For instance, in some embodiments, thrust provided by the one or more propeller units 120 at location 610B may be greater than thrust provided by the one or more propeller units 120 at location 610A. Accordingly, in some embodiments, a magnitude of V3A at location 610B may be greater than a magnitude of V2A at location 610A. However, in some embodiments, a magnitude of V3A at location 610B may be less than a magnitude of V2A at location 610A. For instance, in some implementations, at one or more locations 610 the thrust provided by the one or more propeller units 120 may decelerate the aerial vehicle 100. Moreover, in some embodiments, the one or more propeller units 120 may be throttled up by the control system 160.

Further, the one or more propeller units 120 may be throttled up by accelerating one or more motors. For instance, in some embodiments, the first propeller unit 120A may be throttled up by accelerating motor 124A. Further still, in some embodiments, the second propeller unit 120B may be throttled up by accelerating motor 124B.

Further, the one or more propeller units 120 may be throttled up by turning on some or all of the one or more propeller units at different time periods. For instance, in some embodiments, the first propeller unit 120A may be turned on during a first time period and the second propeller unit 120B may be turned on during a second time period.

Example 600 continues at one or more locations 612 with the aerial vehicle 100 descending in hover flight. In some embodiments, at the one or more locations 612 the one or more propeller units 120 may provide thrust for the aerial vehicle 100 to descend in hover flight. Moreover, in some embodiments, at location 612 the one or more propulsion units 140 maybe turned off.

In this example, the one or more locations 612 is shown as two locations, a location 612A and a location 612B. However, in other examples, the one or more locations 612 may include less than two or more than two locations.

As shown in FIG. 6, at location 612A the aerial vehicle 100 may descend with a velocity V4, and at location 612B the aerial vehicle 100 may ascend with a velocity V5. In some embodiments, a magnitude of V4 may be greater than a magnitude of V5.

In the illustrated example, at location 612A the aerial vehicle 100 may descend substantially vertically. Accordingly, in the illustrated example, V4 may be substantially perpendicular to the ground 602. In some embodiments, the aerial vehicle 100 may descend vertically or a deviation from vertically that does not cause the aerial vehicle 100 to operate in a significantly different manner from when the aerial vehicle 100 descends vertically. Moreover, in some embodiments, V4 may be perpendicular to the ground 602 or a deviation from perpendicular that does not cause the aerial vehicle to operate in a significantly different manner from when V4 is perpendicular to the ground 602.

However, in some embodiments, at location 612A the aerial vehicle 100 may descend in a direction that has a first component that is perpendicular to the ground 602 and a second component that is parallel to the ground 602. Accordingly, in some embodiments, V4 may have a first component that is perpendicular to the ground and a second component that is parallel to the ground. And in at least one such embodiment, a magnitude of the first component of V4 may be greater than a magnitude of the second component of V4.

Similarly, in the illustrated example, at location 612B the aerial vehicle 100 may descend substantially vertically. Accordingly, in the illustrated example, V5 may be substantially perpendicular to the ground 602. However, in some embodiments, at location 612B the aerial vehicle 100 may descend in a direction that has a first component that is perpendicular to the ground 602 and a second component that is parallel to the ground 602. Accordingly, in some embodiments, V5 may have a first component that is perpendicular to the ground 602 and a second component that is parallel to the ground 602. And in at least one such embodiment, a magnitude of the first component of V5 may be greater than a magnitude of the second component of V5. In some embodiments, the one or more propeller units 120 may be throttled down at the one or more locations 612.

Example 600 continues at location 614 with landing the aerial vehicle 100 on the ground 602. In some embodiments, the aerial vehicle 100 may land substantially vertically, via a soft touch down.

As shown in FIG. 6, at locations 604 and 610-614 the aerial vehicle has substantially the same orientation. In the illustrated example, at locations 604 and 610-614 the aerial vehicle 100 may be oriented substantially parallel to the ground 602. In some embodiments, the orientation may be the same or a deviation from the same that does not cause the aerial vehicle 100 to operate in a significantly different manner from when the orientation is the same. Moreover, the aerial vehicle 100 may be oriented parallel to the ground 602 or a deviation from parallel that does not cause the aerial vehicle 100 to operate in a significantly different manner from when the aerial vehicle 100 is oriented parallel to the ground 602.

Although example 600 has been described as being carried out by the aerial vehicle 100, other aerial vehicles may carry out example 600 as well. For instance, the aerial vehicle 200 and the aerial vehicle 300 may each carry out example 600.

For example, when the aerial vehicle 300 carries out example 600, at location 604 the one or more propeller blades of the one or more propeller units 320 may rotate to increase respective angles between respective propeller blades and an axis defined by the first direction 606 in the same or similar way as the one or more propeller blades may rotate at location 412.

Further, numerous variations to example 600 are possible as well. For instance, although the aerial vehicle 100 has been described as descending at location 610A and location 610B above, in other examples the aerial vehicle 100 may ascend at location 610A and/or location 610B.

Figure 7:
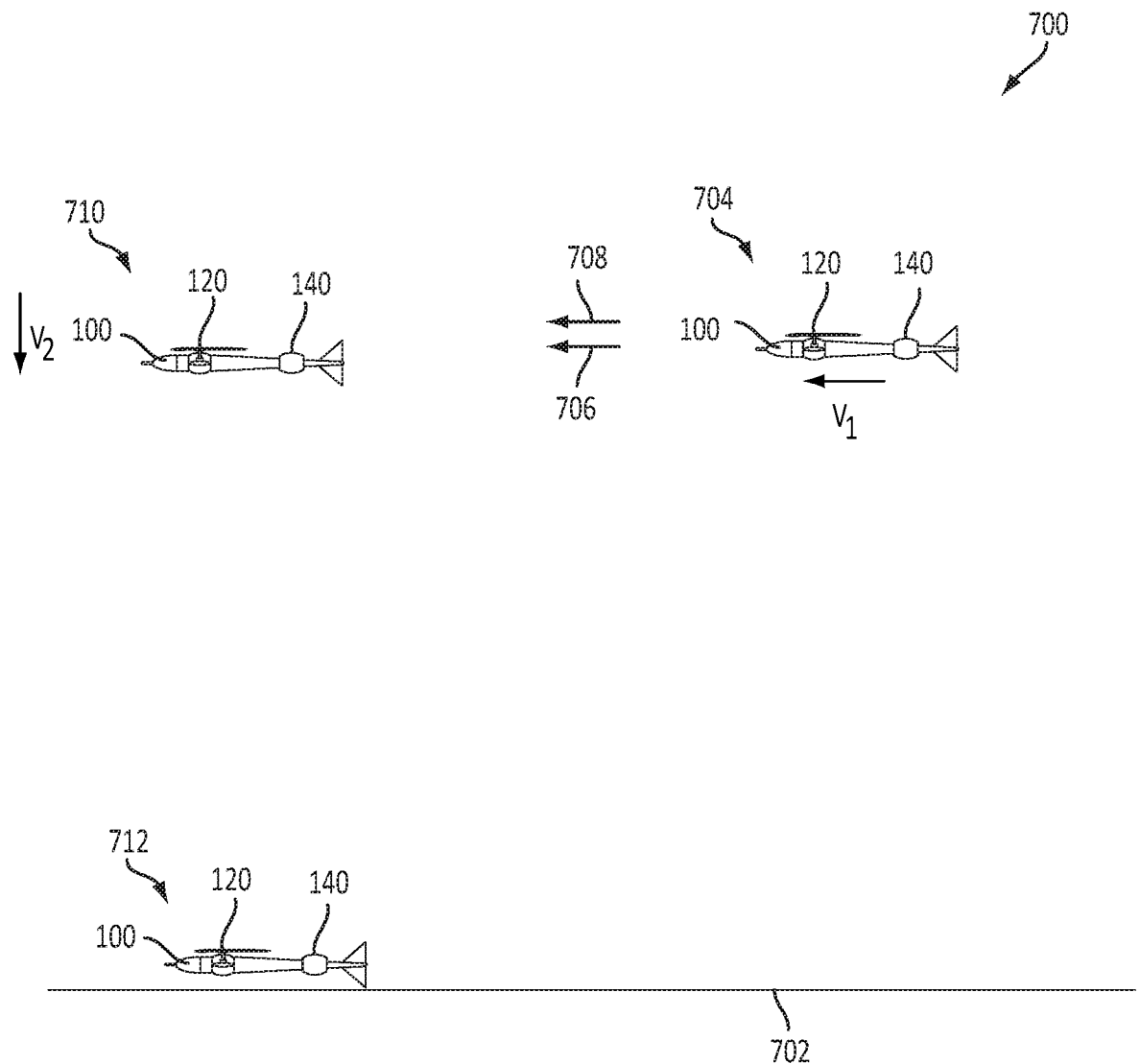
FIG. 7 is another example of an aerial vehicle landing, according to an example embodiment.

Other examples of landing are possible as well. For instance, FIG. 7 depicts an example 700 of an aerial vehicle taking off and entering flight, according to an example embodiment. Example 700 is generally described by way of example as being carried out by the aerial vehicle 100 described above in connection with FIG. 1. For illustrative purposes, example 700 is described in the series of actions shown in FIG. 7 at locations along a path of travel, though example 700 could be carried in any number of actions and/or combination of actions.

Example 700 begins at location 704 with the aerial vehicle 100 in forward flight in a first direction 706 over ground 702. The ground 702 may take the form of or be similar in form to the ground 402, the ground 502, and/or the ground 602. In some embodiments, at location 704 the one or more propulsion units 140 may provide thrust for the aerial vehicle 100 for forward flight. Moreover, in some embodiments, the one or more propulsion units 140 may be operated by the control system 160.

At location 704, the one or more propulsion units 120 may be turned off and the one or more propeller units 120 may each be oriented in one or more respective second directions 708 that are each substantially parallel to the first direction 706. In some embodiments, the one or more respective second directions 708 may be parallel to the first direction 706 or a deviation from parallel that does not cause the aerial vehicle 100 to operate in a significantly different manner when the one or more respective second directions 708 are parallel to the first direction 706. The one or more propeller units 120 may be oriented in one or more respective second directions at location 702 in the same or similar way as the one or more propeller units 120 may be oriented in one or more respective second directions at location 412.

As shown in FIG. 7, the aerial vehicle 100 may translate over the ground 702 with a velocity V1. In the illustrated example, the first direction 706 may be substantially parallel to the ground 702. Accordingly, with this arrangement, V1 may be substantially parallel to the ground 702. In some embodiments, the first direction 706 may be parallel to the ground 702 or a deviation from parallel that does not cause the aerial vehicle 100 to operate in a significantly different manner from when the first direction 706 is parallel to the ground 702. Moreover, in some embodiments, V1 may be parallel to the ground 702 or a deviation from parallel that does not cause the aerial vehicle 100 to operate in a significantly different manner from when V1 is parallel to the ground 702.

However, in other examples, the first direction 706 may have a first component that is perpendicular to the ground 702 and a second component that is parallel to the ground 702. Accordingly, with this arrangement, V1 may have a first component that is perpendicular to the ground and a second component that is parallel to the ground. In some embodiments, a magnitude of the second component of V1 may be greater than a magnitude of the first component of V1.

Example 700 continues at location 710 with operating the one or more propeller units 120, such that the aerial vehicle 100 enters hover flight. In some embodiments, at location 710 the one or more propeller units 120 may provide thrust for hover flight of the aerial vehicle 100. Moreover, at location 710, the one or more propulsion units may be turned off.

In the illustrated example, at location 710 hover flight of the aerial vehicle 100 may be substantially vertical. Accordingly, in the illustrated example, at location 710 the aerial vehicle 100 may enter hover flight (and descend toward the ground 702) with a velocity V2 that is substantially perpendicular to the ground 702. In some embodiments, the hover flight may be vertical or a deviation from vertical that does not cause the aerial vehicle 100 to operate in a significantly different manner from when the hover flight is vertical. Moreover, V2 may be perpendicular to the ground 702 or a deviation from perpendicular that does not cause the aerial vehicle 100 to operate in a manner that is significantly different from when V2 is perpendicular to the ground 702.

However, in some embodiments, at location 710, the aerial vehicle may enter hover flight (and descend toward the ground 702) in a direction that has a first component that is perpendicular to the ground 702 and a second component that is parallel to the ground 702. Accordingly, in some embodiments, V2 may have a first component that is perpendicular to the ground 702 and a second component that is parallel to the ground 702. And in at least one such embodiment, a magnitude of the first component V2 may be greater than a magnitude of the second component of V2.

Example 700 continues at location 712 with landing the aerial vehicle 100 on the ground 702. In some embodiments, the aerial vehicle 100 may land substantially vertically, via a soft touch down.

At locations 704, 710, and 712 the aerial vehicle 100 may have the substantially same orientation. In the illustrated example, at locations 704, 710, and 712 the aerial vehicle 100 may be oriented substantially parallel to the ground 702. In some embodiments, the orientation may be the same or a deviation from the same that does not cause the aerial vehicle 100 to operate in a manner that is significantly different from when the orientation is the same. Moreover, in some embodiments, the aerial vehicle 100 may be oriented parallel to the ground 702 or a deviation from parallel that does not cause the aerial vehicle 100 to operate in a manner significantly different from when the aerial vehicle 100 is oriented parallel to the ground 702.

Although example 700 has been described as being carried out by the aerial vehicle 100, other aerial vehicles may carry out example 700 as well. For instance, the aerial vehicle 200 and the aerial vehicle 300 may each carry out example 700.

For example, when the aerial vehicle 300 carries out example 700, at location 704 the one or more propeller blades of the one or more propeller units 320 may rotate to increase respective angles between respective propeller blades and an axis defined by the first direction 706 in the same or similar way as the one or more propeller blades may rotate at location 412.

While examples of takeoff and entering flight and landing have been described above, aerial vehicles described herein may perform other flight maneuvers via its propeller units and propulsion units. For instance, in some embodiments, aerial vehicles may perform three-dimensional flight maneuvers such as an upside-down hover, a continuous tail-down "tic-toc," loops, loops with pirouettes, stall-turns with pirouette, knife-edge, immelmann, slapper, and traveling flips, among others.

Moreover, in some embodiments, aerial vehicles may roll right, roll left, pitch forward, or pitch backward depending the operation of its propeller units and propulsion units. Further, aerial vehicles may perform a yaw-left or yaw-right movement.

III. ILLUSTRATIVE COMPONENTS OF A UAV

Figure 8:
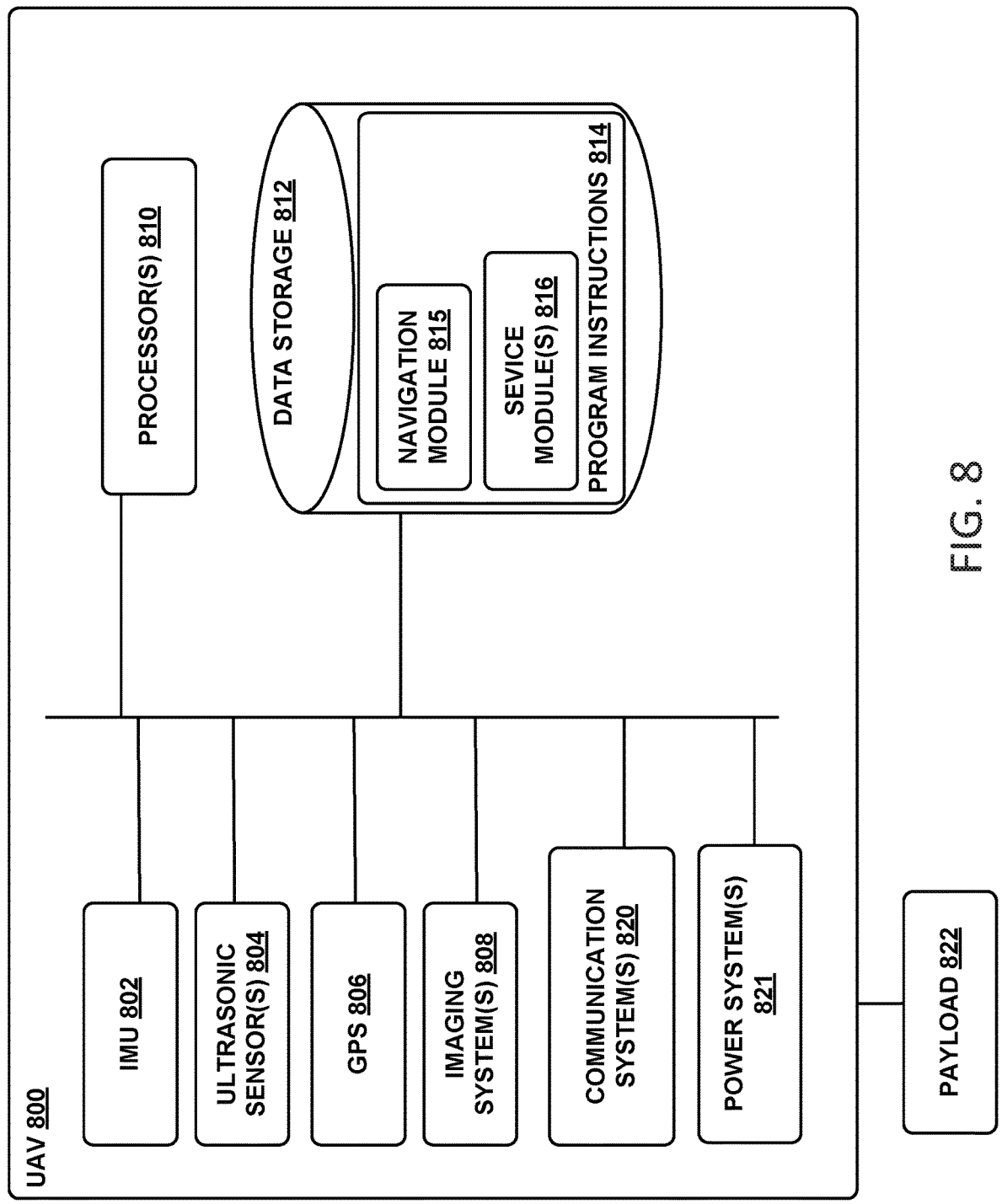
FIG. 8 is a simplified block diagram illustrating components of an unmanned aerial vehicle, according to an example embodiment.

FIG. 8 is a simplified block diagram illustrating components of a UAV 800, according to an example embodiment. UAV 800 may take the form of or be similar in form to one of the aerial vehicles 100, 200, and 300 shown in FIGS. 1-3. However, a UAV 800 may also take other forms.

UAV 800 may include various types of sensors, and may include a computing system configured to provide the functionality described herein. In the illustrated embodiment, the sensors of UAV 800 include an inertial measurement unit (IMU) 802, ultrasonic sensor(s) 804, GPS 806, imaging system(s) 808, among other possible sensors and sensing systems.

In the illustrated embodiment, UAV 800 also includes one or more processors 810. A processor 810 may be a general-purpose processor or a special purpose processor (e.g., digital signal processors, application specific integrated circuits, etc.). The one or more processors 810 can be configured to execute computer-readable program instructions 814 that are stored in the data storage 812 and are executable to provide the functionality of a UAV described herein.

The data storage 812 may include or take the form of one or more computer-readable storage media that can be read or accessed by at least one processor 810. The one or more computer-readable storage media can include volatile and/or non-volatile storage components, such as optical, magnetic, organic or other memory or disc storage, which can be integrated in whole or in part with at least one of the one or more processors 810. In some embodiments, the data storage 812 can be implemented using a single physical device (e.g., one optical, magnetic, organic or other memory or disc storage unit), while in other embodiments, the data storage 812 can be implemented using two or more physical devices.

As noted, the data storage 812 can include computer-readable program instructions 814 and perhaps additional data, such as diagnostic data of the UAV 800. As such, the data storage 814 may include program instructions to perform or facilitate some or all of the UAV functionality described herein. For instance, in the illustrated embodiment, program instructions 814 include a navigation module 815 and one or more service modules 816.

A. Sensors

In an illustrative embodiment, IMU 802 may include both an accelerometer and a gyroscope, which may be used together to determine the orientation of the UAV 800. In particular, the accelerometer can measure the orientation of the vehicle with respect to earth, while the gyroscope measures the rate of rotation around an axis. IMUs are commercially available in low-cost, low-power packages. For instance, an IMU 802 may take the form of or include a miniaturized MicroElectroMechanical System (MEMS) or a NanoElectroMechanical System (NEMS). Other types of IMUs may also be utilized.

An IMU 802 may include other sensors, in addition to accelerometers and gyroscopes, which may help to better determine position and/or help to increase autonomy of the UAV 800. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 800, slight errors in measurement may compound over time and result in a more significant error. However, an example UAV 800 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 800 may also include a pressure sensor or barometer, which can be used to determine the altitude of the UAV 800. Alternatively, other sensors, such as sonic altimeters or radar altimeters, can be used to provide an indication of altitude, which may help to improve the accuracy of and/or prevent drift of an IMU.

In a further aspect, UAV 800 may include one or more sensors that allow the UAV to sense objects in the environment. For instance, in the illustrated embodiment, UAV 800 includes ultrasonic sensor(s) 804. Ultrasonic sensor(s) 804 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 800 also includes a GPS receiver 806. The GPS receiver 806 may be configured to provide data that is typical of well-known GPS systems, such as the GPS coordinates of the UAV 800. Such GPS data may be utilized by the UAV 800 for various functions. As such, the UAV may use its GPS receiver 806 to help navigate to the caller's location, as indicated, at least in part, by the GPS coordinates provided by their mobile device. Other examples are also possible.

UAV 800 may also include one or more imaging system(s) 808. For example, one or more still and/or video cameras may be utilized by a UAV 800 to capture image data from the UAV's environment. As a specific example, charge-coupled device (CCD) cameras or complementary metal-oxide-semiconductor (CMOS) cameras can be used with unmanned vehicles. Such imaging sensor(s) 808 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 800 may use its one or more imaging system(s) 808 to help in determining location. For example, UAV 800 may capture imagery of its environment and compare it to what it expects to see in its environment given current estimated position (e.g., its current GPS coordinates), and refine its estimate of its position based on this comparison.

In a further aspect, UAV 800 may include one or more microphones. Such microphones may be configured to capture sound from the UAV's environment.

B. Navigation and Location Determination

The navigation module 815 may provide functionality that allows the UAV 800 to, e.g., move about in its environment and reach a desired location. To do so, the navigation module 815 may control the altitude and/or direction of flight by controlling the mechanical features of the UAV that affect flight.

In order to navigate the UAV 800 to a target location, a navigation module 815 may implement various navigation techniques, such as map-based navigation and localization-based navigation, for instance. With map-based navigation, the UAV 800 may be provided with a map of its environment, which may then be used to navigate to a particular location on the map. With localization-based navigation, the UAV 800 may be capable of navigating in an unknown environment using localization. Localization-based navigation may involve a UAV 800 building its own map of its environment and calculating its position within the map and/or the position of objects in the environment. For example, as a UAV 800 moves throughout its environment, the UAV 800 may continuously use localization to update its map of the environment. This continuous mapping process may be referred to as simultaneous localization and mapping (SLAM). Other navigation techniques may also be utilized.

In some embodiments, the navigation module 815 may navigate using a technique that relies on waypoints. In particular, waypoints are sets of coordinates that identify points in physical space. For instance, an air-navigation waypoint may be defined by a certain latitude, longitude, and altitude. Accordingly, navigation module 815 may cause UAV 800 to move from waypoint to waypoint, in order to ultimately travel to a final destination (e.g., a final waypoint in a sequence of waypoints).

In a further aspect, navigation module 815 and/or other components and systems of UAV 800 may be configured for "localization" to more precisely navigate to the scene of a medical situation. More specifically, it may be desirable in certain situations for a UAV to be close to the person to whom an item is being delivered by a UAV (e.g., within reach of the person). To this end, a UAV may use a two-tiered approach in which it uses a more-general location-determination technique to navigate to a target location or area that is associated with the medical situation, and then use a more-refined location-determination technique to identify and/or navigate to the target location within the general area.

For example, a UAV 800 may navigate to the general area of a person to whom an item is being delivered using waypoints. Such waypoints may be pre-determined based on GPS coordinates provided by a remote device at the target delivery location. The UAV may then switch to a mode in which it utilizes a localization process to locate and travel to a specific location of the person in need. For instance, if a person is having a heart attack at a large stadium, a UAV 800 carrying a medical package may need to be within reach of the person or someone near the person so that the can take items from the package. However, a GPS signal may only get a UAV so far, e.g., to the stadium. A more precise location-determination technique may then be used to find the specific location of the person within the stadium.

Various types of location-determination techniques may be used to accomplish localization of a person or a device once a UAV 800 has navigated to the general area of the person or device. For instance, a UAV 800 may be equipped with one or more sensory systems, such as, for example, imaging system(s) 808, a directional microphone array (not shown), ultrasonic sensors 804, infrared sensors (not shown), and/or other sensors, which may provide input that the navigation module 815 utilizes to navigate autonomously or semi-autonomously to the specific location of a person.

As another example, once the UAV 800 reaches the general area of a target delivery location (or of a moving subject such as a person or their mobile device), the UAV 800 may switch to a "fly-by-wire" mode where it is controlled, at least in part, by a remote operator, who can navigate the UAV 800 to the specific location of the person in need. To this end, sensory data from the UAV 800 may be sent to the remote operator to assist them in navigating the UAV to the specific location. For example, the UAV 800 may stream a video feed or a sequence of still images from the UAV's imaging system(s) 808. Other examples are possible.

As yet another example, the UAV 800 may include a module that is able to signal to a passer-by for assistance in either reaching the specific target delivery location; for example, a UAV may displaying a visual message requesting such assistance in a graphic display, play an audio message or tone through speakers to indicate the need for such assistance, among other possibilities. Such a visual or audio message might indicate that assistance is needed in delivering the UAV 800 to a particular person or a particular location, and might provide information to assist the passer-by in delivering the UAV 800 to the person or location (e.g., a description or picture of the person or location, and/or the person or location's name), among other possibilities. Such a feature can be useful in a scenario in which the UAV is unable to use sensory functions or another location-determination technique to determine the specific location of the person. However, this feature is not limited to such scenarios.

In some embodiments, once a UAV 800 arrives at the general area of a person who requested service and/or at the general area that includes a target delivery location, the UAV may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., an RF signal, a light signal and/or an audio signal). In this scenario, the UAV may be configured to navigate by "sourcing" such directional signals—in other words, by determining where the signal is strongest and navigating accordingly. As another example, a mobile device can emit a frequency, either in the human range or outside the human range, and the UAV can listen for that frequency and navigate accordingly. As a related example, if the UAV is listening for spoken commands, then the UAV could utilize spoken statements, such as "Help! I'm over here!" to source the specific location of the person in need of medical assistance.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its mechanical features in order to effectuate such movements. The remote computing system may then communicate such adjustments to the UAV so it can move in the determined manner.

C. Communication Systems

In a further aspect, UAV 800 includes one or more communication systems 820. The communications systems 820 may include one or more wireless interfaces and/or one or more wireline interfaces, which allow UAV 800 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols.

Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 800 may include communication systems 820 that allow for both short-range communication and long-range communication. For example, the UAV 800 may be configured for short-range communications using Bluetooth and for long-range communications under a CDMA protocol. In such an embodiment, the UAV 800 may be configured to function as a "hot spot;" or in other words, as a gateway or proxy between a remote support device and one or more data networks, such as cellular network and/or the Internet. Configured as such, the UAV 800 may facilitate data communications that the remote support device would otherwise be unable to perform by itself.

For example, UAV 800 may provide a WiFi connection to a remote device, and serve as a proxy or gateway to a cellular service provider's data network, which the UAV might connect to under an LTE or a 3G protocol, for instance. The UAV 800 could also serve as a proxy or gateway to a high-altitude balloon network, a satellite network, or a combination of these networks, among others, which a remote device might not be able to otherwise access.

D. Power Systems

In a further aspect, UAV 800 may include power system(s) 821. A power system 821 may include one or more batteries for providing power to the UAV 800. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

A UAV 800 may employ various systems and configurations in order to transport items. In the illustrated embodiment, a payload 822 may serve as a compartment that can hold one or more items, such that a UAV 800 can deliver the one or more items to a target delivery location. For example, as shown in FIG. 1, the body 102 can include a compartment, in which an item or items may be transported. As another example, the UAV can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items to the scene of the medical situation. Other examples are also possible. In some implementations, the payload 822 of a given UAV 800 may include or take the form of a "package" designed to transport medical-support items to a target delivery location. For example, a medical-support UAV may include a package with one or more items for medical support in the particular medical situation, and/or one or more medical-support modules 816 that are designed to provide medical support in the particular medical situation. In some cases, a UAV 800 may include a package that is designed for a particular medical situation such as choking, cardiac arrest, shock, asthma, drowning, etc. In other cases, a UAV 800 may include a package that is designed for a number of different medical situations, which may be associated in some way.

Such medical support items may aid in diagnosing and/or treating a person who needs medical assistance, or may serve other purposes. Example of medical-support items include, but are not limited to: (a) medicines, (b) diagnostic devices, such as a pulse oximeter, blood pressure sensor, or EKG sensor, (c) treatment devices, such as an EpiPen, a first aid kit, or various kinds of defibrillators (e.g., an automated external defibrillator (AED)), and/or (d) remote support devices, such as a mobile phone or a head-mountable device (HMD), among other possibilities. Note that some items that are electronic may include one or more batteries to provide power to the item. These batteries may be rechargeable and may be recharged using one or more wired or wireless charging systems. In addition or on in the alternative, an item may be integrated with one or more batteries in the power system 821 for power.

In some embodiments, a UAV 800 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, a UAV 800 might function as a mobile defibrillator. Specifically, rather than carry a stand-alone defibrillator that can then be removed from the UAV for use, the UAV itself may function as a defibrillator.

F. Service Modules

As noted above, UAV 800 may include one or more service modules 816. The one or more service modules 816 include software, firmware, and/or hardware that may help to provide or assist in the provision of the UAV-related services.

Configured as such, a UAV 800 may provide various types of service. For instance, a UAV 800 may have stored information that can be provided to a person or persons at the target location, in order to assist the person or persons in various ways. For example, a UAV may include a video or audio file with instructions for performing some task, which the UAV can play out to a person at the target location. As another example, a UAV may include an interactive program to assist a person at the target location in performing some task. For instance, a UAV may include an application that analyzes the person's speech to detect questions related to the medical situation and/or that provides a text-based interface via which the person can ask such questions, and then determines and provides answers to such questions.

In some embodiments, a UAV 800 may facilitate communication between a layperson and/or medical personnel at the scene and medical personnel at a remote location. As an example, a service module 816 may provide a user interface via which a person at the scene can use a communication system 820 of the UAV to communicate with an emergency medical technician at a remote location. As another example, the UAV 800 can unlock certain capabilities of a remote device, such as a mobile phone, which is near the UAV at the scene of a medical situation. Such capabilities may be inaccessible to a user of the remote device, unless the remote device is within a certain distance from the UAV such that the UAV can unlock the capabilities. For example, a UAV may send the remote device a security key that allows the remote device to establish a secure connection to communicate with medical personnel at a remote location. Other examples are also possible.

IV. ILLUSTRATIVE METHODS

Figure 9:
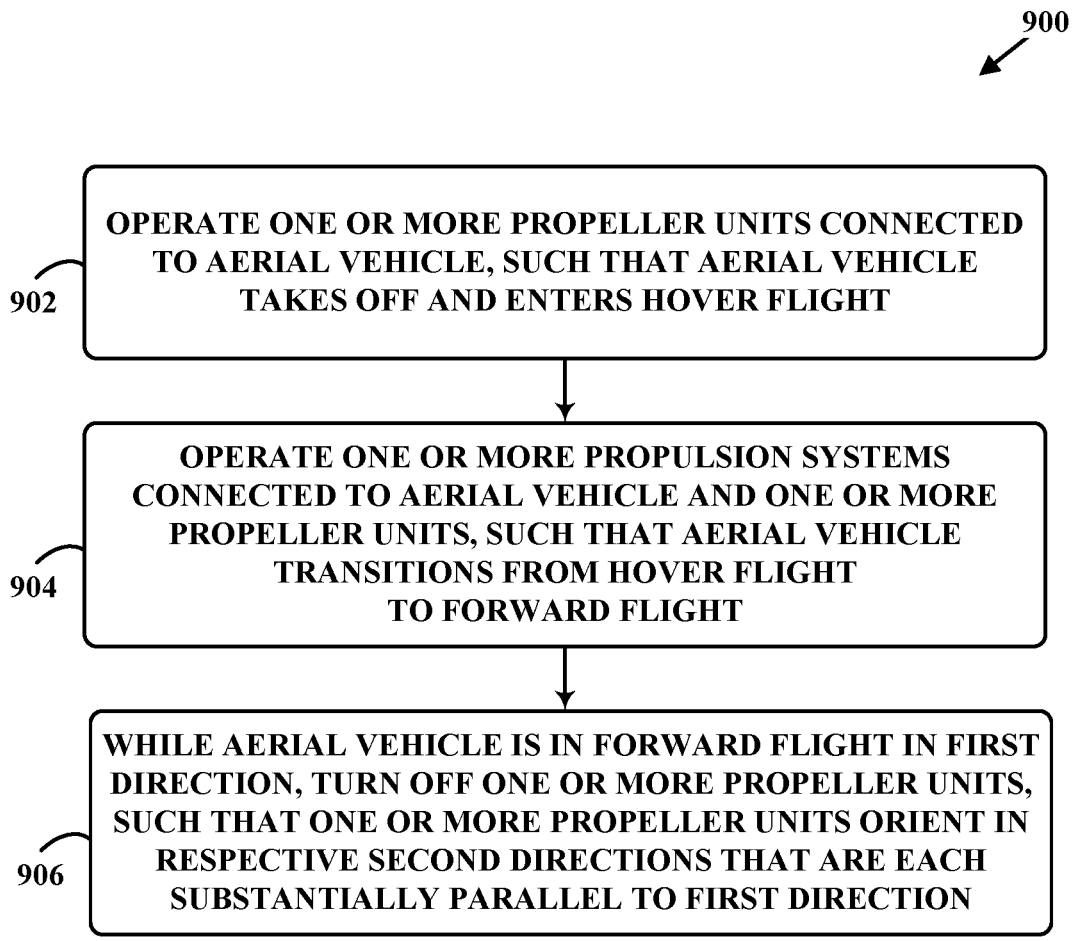
FIG. 9 is a flow chart of a method for taking off and entering flight, according to an example embodiment.

FIG. 9 is a flow chart illustrating a method 900 for takeoff and flight, according to an example embodiment. Illustrative methods, such as method 900, may be carried out in whole or in part by a component or components of an aerial vehicle, such as by the one or more of the components of the aerial vehicle 100 shown in FIG. 1, the aerial vehicle 200 shown in FIG. 2, and the aerial vehicle 300 shown in FIG. 3. For simplicity, method 900 may be described generally as being carried out by an aerial vehicle, such as the aerial vehicle 100. However, it should be understood that example methods, such as method 900, may be carried out by other entities or combinations of entities without departing from the scope of this disclosure.

As shown by block 902, method 900 involves operating one or more propeller units connected to an aerial vehicle, such that the aerial vehicle takes off and enters hover flight. At block 902, the one or more propeller units may be operated in the same or similar way as the one or more propeller units 120 may be operated at location 406 of example 400 as described with reference to FIG. 4.

As shown by block 904, method 900 involves operating one or more propulsion units connected to the aerial vehicle and the one or more propeller units, such that the aerial vehicle transitions from hover flight to forward flight. At block 904, the one or more propulsion units and the one or more propeller units may be operated in the same or similar way as the one or more propulsion units 140 and the one or more propeller units 120 may be operated at one or more locations 410 of example 400 as described with reference to FIG. 4.

As shown by block 906, method 900 involves while the aerial vehicle is in forward flight in a first direction, turning off the one or more propeller units, such that the one or more propeller units orient in one or more respective second directions that are each substantially parallel to the first direction. At block 906, the one or more propeller units may be turned off in the same or similar way as the one or more propeller units 120 may be turned off at location 412 of example 400 as described with reference to FIG. 4.

For instance, in some embodiments, the aerial vehicle may include a control system, and turning off the one or more propeller units, such that the one or more propeller units orient in one or more respective second directions may involve the control system turning off the one or more propeller units.

Moreover, in some embodiments, turning off the one or more propeller units, such that the one or more propeller units orient in one or more respective second directions may involve turning off the one or more propeller units when the aerial vehicle has a certain speed.

Further, in some embodiments, the one or more propeller units may include a first propeller unit and a second propeller unit, and turning off the one or more propeller units, such that the one or more propeller units orient in respective second directions, may involve turning off the first propeller unit and the second propeller unit during a first time period, such that the first propeller unit and the second propeller unit orient in the one or more respective second directions during a second time period.

Further still, in some embodiments, the one or more propeller units may include a first propeller unit and a second propeller unit, and turning off the one or more propeller units, such that the one or more propeller units orient in respective second directions, may involve turning off the first propeller unit during a first time period and turning off the second propeller unit during a second time period, such that the first propeller unit orients in one or more first respective second directions during a third time period and the second propeller unit orients in one or more second respective second directions during a fourth time period.

Moreover, method 900 may further involve operating the aerial vehicle to ascend in hover flight. The aerial vehicle may be operated to ascend in hover flight in the same or similar way as the aerial vehicle 100 may be operated to ascend in hover flight at one or more locations 408 of example 400 as described with reference to FIG. 4.

Figure 10:
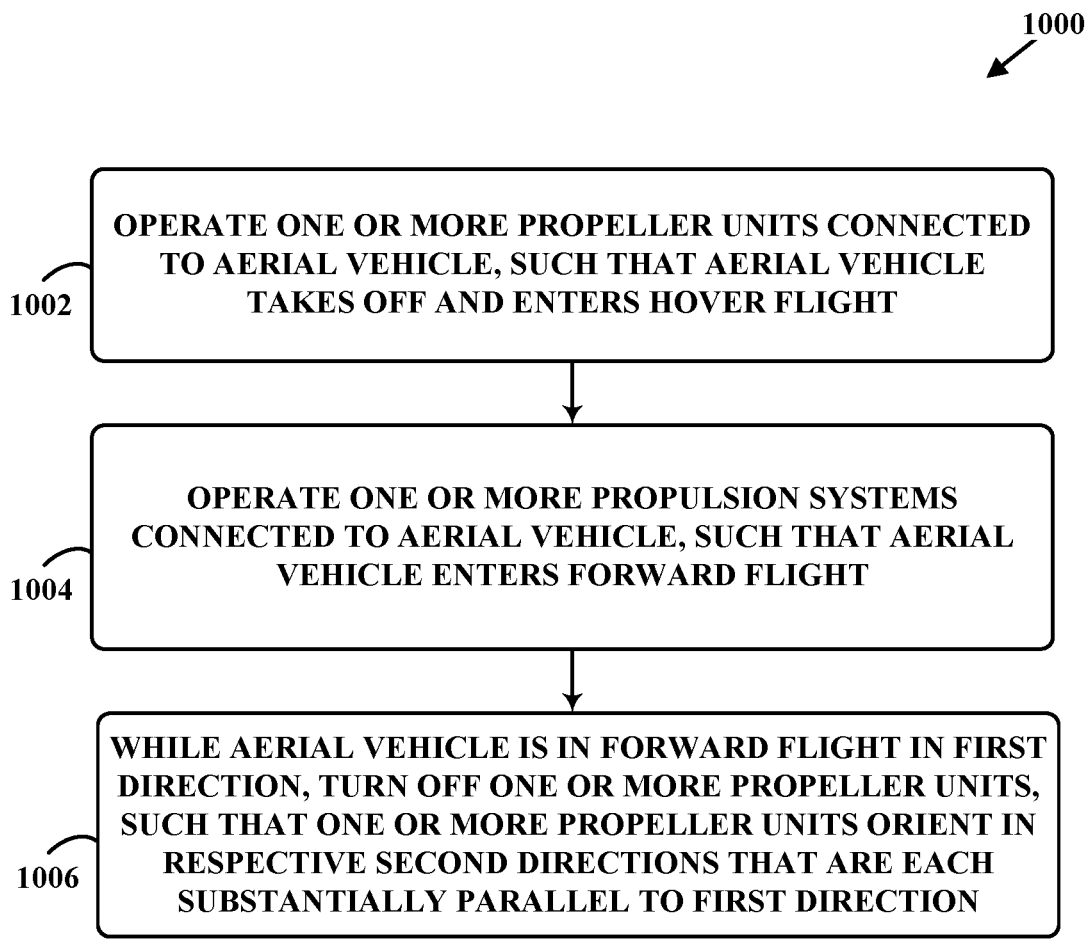
FIG. 10 is a flow chart of another method for taking off and entering flight, according to an example embodiment.

FIG. 10 is a flowchart illustrating another method 1000 for takeoff and flight, according to an example embodiment. Illustrative methods, such as method 1000, may be carried out in whole or in part by a component or components of an aerial vehicle, such as by the one or more of the components of the aerial vehicle 100 shown in FIG. 1, the aerial vehicle 200 shown in FIG. 2, and the aerial vehicle 300 shown in FIG. 3. For simplicity, method 1000 may be described generally as being carried out by an aerial vehicle, such as the aerial vehicle 100. However, it should be understood that example methods, such as method 1000, may be carried out by other entities or combinations of entities without departing from the scope of this disclosure.

As shown by block 1002, method 1000 may involve operating one or more propeller units connected the aerial vehicle, such that the aerial vehicle takes off and enters hover flight. At block 1002, the one or more propeller units may be operated in the same or similar way as the one or more propeller units 120 may be operated at location 506 of example 500 as described with reference to FIG. 5.

As shown by block 1004, method 1000 may involve operating one or more propulsion units connected to aerial vehicle, such that the aerial vehicle enters forward flight. At block 1004, the one or more propulsion units may be operated in the same or similar way as the one or more propulsion units 140 may be operated at 508 of example 500 as described with reference to FIG. 5.

As shown by block 1006, the method 1000 may involve while the aerial vehicle is in forward flight in a first direction, turning off the one or more propeller units, such that the one or more propeller units orient in one or more respective second directions that are each substantially parallel to the first direction. At block 1006, the one or more propeller units may be turned off in the same or similar way as the one or more propeller units 120 may be turned off at location 510 of example 500 as described with reference to FIG. 5.

For instance, in some embodiments, the aerial vehicle may include a control system, and turning off the one or more propeller units, such that the one or more propeller units orient in respective second directions may involve the control system turning off the one or more propeller units.

Moreover, in some embodiments, turning off the one or more propeller units, such that the one or more propeller units orient in one or more respective second directions may involve turning off the one or more propeller units when the aerial vehicle has a certain speed.

Further, in some embodiments, the one or more propeller units may include a first propeller unit and a second propeller unit, and turning off the one or more propeller units, such that the one or more propeller units orient in respective second directions, may involve turning off the first propeller unit and the second propeller unit during a first time period, such that the first propeller unit and the second propeller unit orient in the one or more respective second directions during a second time period.

Further still, in some embodiments, the one or more propeller units may include a first propeller unit and a second propeller unit, and turning off the one or more propeller units, such that the one or more propeller units orient in respective second directions, may involve turning off the first propeller unit during a first time period and turning off the second propeller unit during a second time period, such that the first propeller unit orients in one or more first respective second directions during a third time period and the second propeller unit orients in one or more second respective second directions during a fourth time period.

Other methods of taking off and entering flight are possible as well. For instance, a method may involve operating one or more propeller units connected to an aerial vehicle, such that the aerial vehicle takes off and enters hover flight, wherein the one or more propeller units comprise one or more propeller blades. The method may involve operating one or more propulsion units connected to the aerial vehicle and the one or more propeller units, such that the aerial vehicle transitions from hover flight to forward flight. And the method may involve while the aerial vehicle is in forward flight in a first direction, turning off the one or more propeller units, such that the one or more propeller blades rotate to increase respective angles between respective propeller blades and an axis defined by the first direction.

In some embodiments, the aerial vehicle may comprise at least one propeller unit that includes a first propeller blade and a second propeller blade and wherein turning off the one or more propeller units comprises turning off the at least one propeller unit, such that the first propeller blade rotates to increase a first angle between the first propeller blade and the axis defined by the first direction and the second propeller blade rotates to increase a second angle between the second propeller blade and the axis defined by the first direction.

Moreover, in at least one such embodiment, the at least one propeller unit further comprises a shaft coupled to a motor; a hub connected to the shaft, wherein the hub has a first end and second end that is opposite the first end, wherein the first propeller blade and the second propeller blade are both connected to the hub, and turning off the one or more propeller units further comprises turning off the motor, such that the first propeller blade orients in a second direction that is substantially parallel to the first direction and the second propeller blade orients in a third direction that is substantially parallel to the first direction, such that the first propeller blade and the second propeller blade are each oriented substantially downwind of the first end of the hub.

As another example, a method may involve operating one or more propeller units connected to an aerial vehicle, such that the aerial vehicle takes off and enters hover flight, wherein the one or more propeller units each comprise one or more propeller blades. The method may involve operating one or more propulsion units connected to the aerial vehicle, such that the aerial vehicle enters forward flight. And the method may involve while the aerial vehicle is in forward flight in a first direction, turning off the one or more propeller units, such that one or more propeller blades rotate to increase respective angles between respective propeller blades and an axis defined by the first direction.

In some embodiments, the aerial vehicle may comprise at least one propeller unit that includes a first propeller blade and a second propeller blade and wherein turning off the one or more propeller units comprises turning off the at least one propeller unit, such that the first propeller blade rotates to increase a first angle between the first propeller blade and the axis defined by the first direction and the second propeller blade rotates to increase a second angle between the second propeller blade and the axis defined by the first direction.

Moreover, in at least one such embodiment, the at least one propeller unit further comprises a shaft coupled to a motor; a hub connected to the shaft, wherein the hub has a first end and second end that is opposite the first end, wherein the first propeller blade and the second propeller blade are both connected to the hub, and turning off the one or more propeller units further comprises turning off the motor, such that the first propeller blade orients in a second direction that is substantially parallel to the first direction and the second propeller blade orients in a third direction that is substantially parallel to the first direction, such that the first propeller blade and the second propeller blade are each oriented substantially downwind of the first end of the hub.

Figure 11:
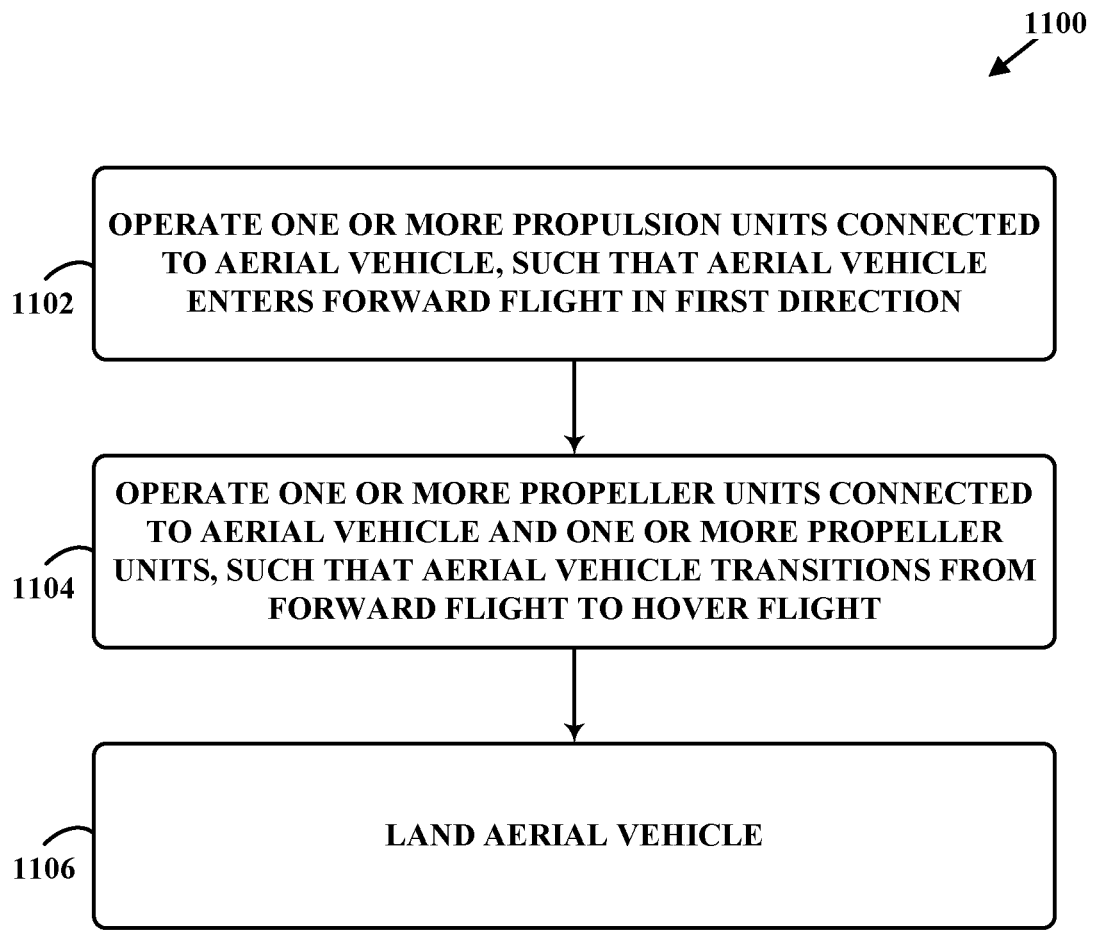
FIG. 11 is a flow chart of a method for landing, according to an example embodiment.

FIG. 11 is a flow chart illustrating a method 1100 of landing, according to an example embodiment. Illustrative methods, such as method 1100, may be carried out in whole or in part by a component or components of an aerial vehicle, such as by the one or more of the components of the aerial vehicle 100 shown in FIG. 1, the aerial vehicle 200 shown in FIG. 2, and the aerial vehicle 300 shown in FIG. 3. For simplicity, method 1100 may be described generally as being carried out by an aerial vehicle, such as the aerial vehicle 100. However, it should be understood that example methods, such as method 1100, may be carried out by other entities or combinations of entities without departing from the scope of this disclosure.

As shown by block 1102, method 1100 may involve operating one or more propulsion units connected to the aerial vehicle, such that the aerial vehicle enters forward flight in a first direction. At block 1102, the one or more propulsion units may be operated in the same or similar way as the one or more propulsion units 140 may be operated at location 604 of example 600 as described with reference to FIG. 6.

As shown by block 1104, method 1100 may involve operating one or more propeller units connected to the aerial vehicle and operating the one or more propulsion units, such that the aerial vehicle transitions from forward flight to hover flight. At block 1104, the one or more propeller units and the one or more propulsion units may be operated in the same or similar way as the one or more propeller units 120 and the one or more propulsion units 140 may be operated at one or more locations 610 of example 600 as described with reference to FIG. 6.

As shown by block 1106, method 1100 may involve landing the aerial vehicle. At block 1106, the aerial vehicle may be landed in the same or similar way as the aerial vehicle 100 may be landed at location 614 of example 600 as described with reference to FIG. 6.

In some embodiments, at block 1102, the one or more propeller units may be turned off and the one or more propeller units may be oriented in one or more respective second directions that are each substantially parallel to the first direction. At block 1102, the one or more propeller units may be turned off in the same or similar way as the one or more propeller units 120 may be turned off at location 604 of example 600 as described with reference to FIG. 6.

Moreover, in some embodiments, the one or more propeller units may comprise one or more propeller blades and at block 1102 the one or more propeller units may be turned off and the one or more propeller blades may be located at respective angles between respective propeller blades and an axis defined by the first direction. And in at least one such embodiment, the respective angles may be greater than 90 degrees.

Further, method 1100 may further involve operating the aerial vehicle to descend in hover flight. And in at least one such embodiment, the aerial vehicle may be operated to descend in hover flight in the same or similar way as the aerial vehicle 100 may be operated to descend in hover flight at one or more locations 612 of example 600 as described with reference to FIG. 6.

Figure 12:
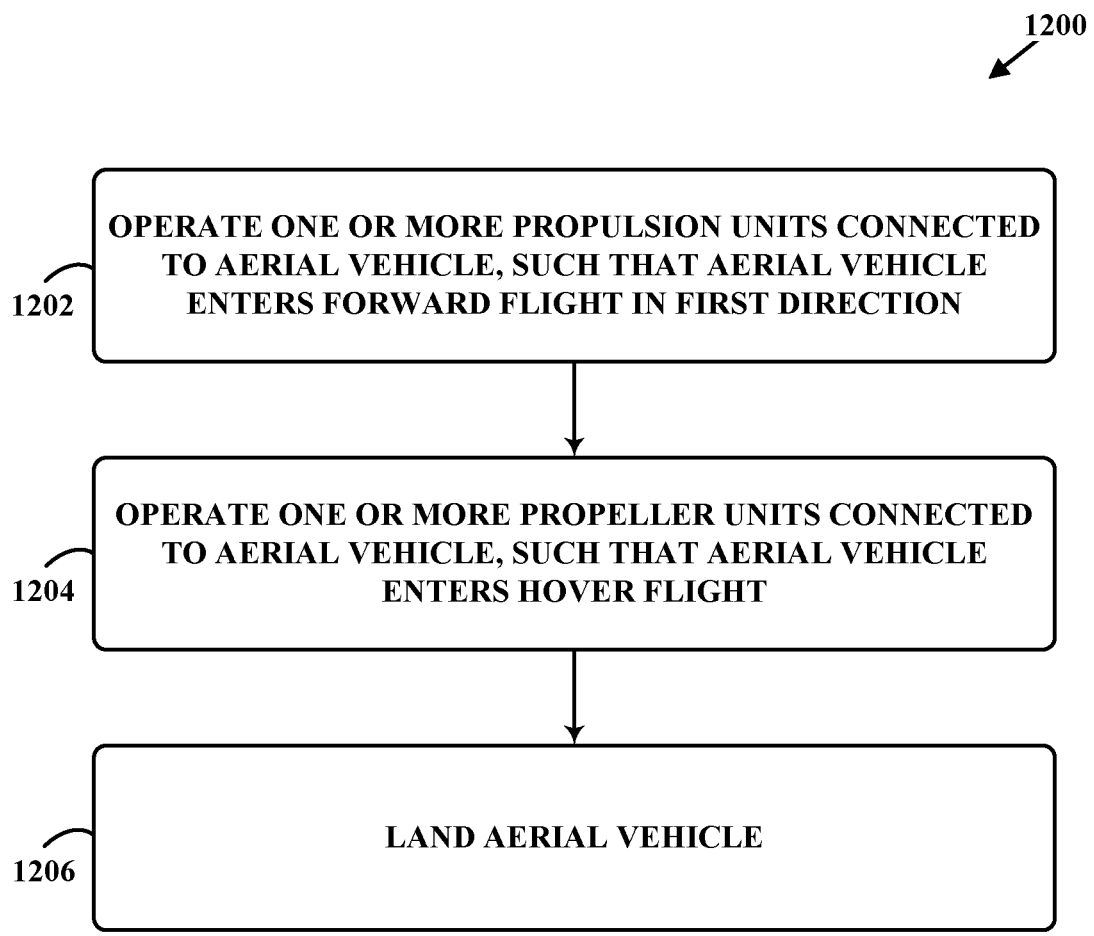
FIG. 12 is a flow chart of another method for landing, according to an example embodiment.

FIG. 12 is a flow chart illustrating another method 1200 of landing, according to an example embodiment. Illustrative methods, such as method 1200, may be carried out in whole or in part by a component or components of an aerial vehicle, such as by the one or more of the components of the aerial vehicle 100 shown in FIG. 1, the aerial vehicle 200 shown in FIG. 2, and the aerial vehicle 300 shown in FIG. 3. For simplicity, method 1200 may be described generally as being carried out by an aerial vehicle, such as the aerial vehicle 100. However, it should be understood that example methods, such as method 1200, may be carried out by other entities or combinations of entities without departing from the scope of this disclosure.

As shown by block 1202, method 1200 may involve operating one or more propulsion units connected to the aerial vehicle, such that the aerial vehicle enters forward flight in a first direction. At block 1202, the one or more propulsion units may be operated in the same or similar way as the one or more propulsion units 140 may be operated at location 704 of example 700 as described with reference to FIG. 7.

As shown by block 1204, method 1200 may involve operating one or more propeller units connected to the aerial vehicle, such that the aerial vehicle enters hover flight. At block 1204, the one or more propeller units may be operated in the same or similar way as the one or more propeller units 120 may be operated at location 710 of example 700 as described with reference to FIG. 7.

As shown by block 1206, method 1200 may involve landing the aerial vehicle. At block 1206, the aerial vehicle may be landed in the same or similar way as the aerial vehicle 100 may be landed at location 712 of example 700 as described with reference to FIG. 7.

In some embodiments, at block 1202, the one or more propeller units may be turned off and the one or more propeller units may be oriented in one or more respective second directions that are each substantially parallel to the first direction. At block 1202, the one or more propeller units may be turned off in the same or similar way as the one or more propeller units 120 may be turned off at location 704 of example 700 as described with reference to FIG. 7.

Moreover, in some embodiments, the one or more propeller units may comprise one or more propeller blades and at block 1202 the one or more propeller units may be turned off and the one or more propeller blades may be located at respective angles between respective propeller blades and an axis defined by the first direction. And in at least one such embodiment, the respective angles may be greater than 90 degrees.

V. APPLICATIONS

Embodiments described herein may have a variety of applications. As one example, embodiments described herein may relate to and/or be implemented in a system in which one or more UAVs, such as the UAV 800, are configured to provide medical support.

In an illustrative embodiment, a medical-support system may include a fleet of UAVs that are distributed throughout a geographic area, such as a city. The medical-support system may be configured for communications between remote devices, such as mobile phones, so that medical support can be requested by a person in need of such medical support (or by others on behalf of a person in need). The medical-support system can then dispatch the appropriate UAV or UAVs to the scene of the medical situation in order to provide medical support.

The fleet of UAVs may be configured to provide other UAV-related services as well, such as package transport and delivery.

VI. CONCLUSION

While various aspects of the disclosure have been disclosed herein, other aspects and embodiments will be apparent to those skilled in the art. Accordingly, the embodiments disclosed herein are for purposes of illustration, and are not intended to be limiting, with the true scope and spirit of the disclosure being indicated by the following claims.

The invention claimed is:

1. An aerial vehicle comprising:
one or more propeller units connected to the aerial vehicle, wherein the one or more propeller units are operable to provide thrust for takeoff of the aerial vehicle or hover flight of the aerial vehicle, wherein at least one propeller unit of the one or more propeller units comprises:
a shaft coupled to a motor;
a hub connected to the shaft, wherein the hub has a first end and second end that is opposite the first end; and
a first propeller blade and a second propeller blade that are both connected to the hub, wherein when the motor is turned on, the first propeller blade and the second propeller blade rotate about an axis of rotation; and
one or more propulsion units connected to the aerial vehicle, wherein the one or more propulsion units are operable to provide thrust for forward flight of the aerial vehicle, wherein while the aerial vehicle is in forward flight in a first direction non-parallel to the axis of rotation and the motor is turned off, in response to incident wind on the at least one propeller unit in a second direction that is substantially perpendicular to the axis of rotation the first propeller blade is configured to rotate in a first plane of rotation about a first hub axis to increase a first angle between the first propeller blade and an axis defined by the first direction and the second propeller blade is configured to rotate in a second plane of rotation about a second hub axis to increase a second angle between the second propeller blade and the axis defined by the first direction, wherein the axis of rotation, first hub axis, and second hub axis is each substantially parallel to the other two axes, wherein the axis of rotation is disposed between the first hub axis and the second hub axis, wherein the first plane of rotation is substantially parallel to the first direction, and wherein the second plane of rotation is substantially parallel to the first direction.

2. The aerial vehicle of claim 1, wherein the incident wind on the at least one propeller unit in the fourth direction contacts the surface area of the first propeller blade so as to cause the first propeller blade to rotate to increase the first angle, and wherein the incident wind on the at least one propeller unit in the fourth direction contacts the surface area of the second propeller blade so as to cause the second propeller blade to rotate to increase the second angle.

3. The aerial vehicle of claim 1, further comprising a control system, wherein the first propeller blade is configured to further rotate to increase the first angle and the second propeller blade is configured to further rotate to increase the second angle in response to the control system positioning the first propeller blade so as to increase the first angle and positioning the second propeller blade so to increase the second angle.

4. The aerial vehicle of claim 1, further comprising a control system, wherein the control system is configured to turn off the at least one propeller unit in response to the aerial vehicle having a certain speed.

5. The aerial vehicle of claim 1, wherein when the motor of the at least one propeller unit is turned on, the first propeller blade and the second propeller blade provide substantially the same thrust along the axis of rotation.

6. The aerial vehicle of claim 1, wherein the first direction is substantially perpendicular to the axis of rotation.

7. The aerial vehicle of claim 1, wherein a body of the aerial vehicle is in a first orientation during takeoff and hover flight, and wherein the body of the aerial vehicle is in a second orientation that is substantially the same as the first orientation during forward flight.

8. The aerial vehicle of claim 7, wherein the first orientation is substantially parallel to ground.

9. An aerial vehicle comprising:
one or more propeller units connected to the aerial vehicle, wherein the one or more propeller units are operable to provide thrust for takeoff of the aerial vehicle or hover flight of the aerial vehicle, wherein at least one propeller unit of the one or more propeller units comprises:
  a shaft coupled to a motor;
  a hub connected to the shaft, wherein the hub has a first end and second end that is opposite the first end; and
  a first propeller blade and a second propeller blade that are both connected to the hub, wherein when the motor is turned on, the first propeller blade and the second propeller blade rotate about an axis of rotation; and
one or more propulsion units connected to the aerial vehicle, wherein the one or more propulsion units are operable to provide thrust for forward flight of the aerial vehicle, wherein while the aerial vehicle is in forward flight in a first direction non-parallel to the axis of rotation and the motor is turned off, the first propeller blade is configured to rotate in a first plane of rotation around a first hub axis so as to orient in a second direction that is substantially parallel to the first direction and the second propeller blade is configured to rotate in a second plane of rotation around a second hub axis so as to orient in a third direction that is substantially parallel to the first direction, such that the first propeller blade and second propeller blade are each oriented substantially downwind of the first end of the hub, wherein the first propeller blade orients in the second direction and the second propeller blade orients in the third direction in response to incident wind on the at least one propeller unit in a fourth direction that is substantially perpendicular to the axis of rotation, wherein the axis of rotation, first hub axis, and second hub axis is each substantially parallel to the other two axes, wherein the axis of rotation is disposed between the first hub axis and the second hub axis, wherein the first plane of rotation is substantially parallel to the first direction, and wherein the second plane of rotation is substantially parallel to the first direction.

10. The aerial vehicle of claim 9, wherein the first end of the hub has a lower coefficient of drag than a coefficient of drag of the second end of the hub.

11. The aerial vehicle of claim 9, wherein the hub is configured to orient in a direction that is substantially parallel to the first direction, such that the first end of the hub is substantially upwind of the second end of the hub.

12. The aerial vehicle of claim 9, wherein the incident wind on the at least one propeller unit in the fourth direction contacts the surface area of the first propeller blade so as to cause the first propeller blade to orient in the second direction, and wherein the incident wind on the at least one propeller unit in the fourth direction contacts the surface area of the second propeller blade so as to cause the second propeller blade to orient in the third direction.

13. The aerial vehicle of claim 9, further comprising a control system, wherein the control system is configured to turn off the at least one propeller unit in response to the aerial vehicle having a certain speed.

14. The aerial vehicle of claim 9, wherein when the motor of the at least one propeller unit is turned on, the first propeller blade and the second propeller blade provide substantially the same thrust along the axis of rotation.

15. The aerial vehicle of claim 9, wherein the first direction is substantially perpendicular to the axis of rotation.

16. The aerial vehicle of claim 9, wherein a body of the aerial vehicle is in a first orientation during takeoff and hover flight, and wherein the body of the aerial vehicle is in a second orientation that is substantially the same as the first orientation during forward flight.

17. The aerial vehicle of claim 16, wherein the first orientation is substantially parallel to ground.

* * * * *